(12) United States Patent
Chopra et al.

(10) Patent No.: US 11,106,544 B2
(45) Date of Patent: Aug. 31, 2021

(54) SYSTEM AND METHOD FOR MANAGEMENT OF LARGESCALE DATA BACKUP

(71) Applicant: EMC IP Holding Company LLC, Hopkinton, MA (US)

(72) Inventors: Shelesh Chopra, Bangalore (IN); Manish Sharma, Bangalore (IN); Sunil Yadav, Bangalore (IN); Amit Jain, Bangalore (IN); Aaditya Rakesh Bansal, Bangalore (IN); Sneha Yadav, Bangalore (IN); Jayashree B. Radha, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 249 days.

(21) Appl. No.: 16/395,672

(22) Filed: Apr. 26, 2019

(65) Prior Publication Data

US 2020/0341858 A1 Oct. 29, 2020

(51) Int. Cl.
*G06F 16/00* (2019.01)
*G06F 11/14* (2006.01)
*G06F 9/455* (2018.01)

(52) U.S. Cl.
CPC ...... *G06F 11/1461* (2013.01); *G06F 9/45558* (2013.01); *G06F 11/1464* (2013.01); *G06F 2009/45583* (2013.01); *G06F 2009/45595* (2013.01); *G06F 2201/815* (2013.01)

(58) Field of Classification Search
CPC ............ G06F 11/1461; G06F 9/45558; G06F 11/1464; G06F 2009/45583; G06F 2009/45595; G06F 2201/815; G06F 11/1448
See application file for complete search history.

(56) References Cited

U.S. PATENT DOCUMENTS

| | | | |
|---|---|---|---|
| 7,395,244 B1 * | 7/2008 | Kingsford | G06Q 10/06 705/52 |
| 8,479,297 B1 * | 7/2013 | Edukulla | H04L 63/1433 726/25 |
| 8,510,271 B1 | 8/2013 | Tsaur et al. | |
| 8,554,918 B1 | 10/2013 | Douglis | |
| 8,849,947 B1 * | 9/2014 | Artzi | G06F 9/45558 709/217 |
| 9,037,547 B1 | 5/2015 | Shivdeo | |

(Continued)

OTHER PUBLICATIONS

Extended European Search Report issued in corresponding European Application No. 20166272.3, dated Sep. 28, 2020.

(Continued)

*Primary Examiner* — Alexander Khong
(74) *Attorney, Agent, or Firm* — Chamberlain, Hrdlicka, White, Williams & Aughtry

(57) ABSTRACT

A remote agent for providing data protection services includes persistent storage and a backup manager. The persistent storage stores lifecycle policies. The backup manager updates an asset catalog using an asset map associated with a virtual machine; generates a lifecycle policy of the lifecycle policies using the asset catalog; and generates a backup for the virtual machine using the lifecycle policy. The lifecycle policy prioritizes generating the backup for the virtual machine over generating a second backup for a second virtual machine.

16 Claims, 16 Drawing Sheets

(56) References Cited

U.S. PATENT DOCUMENTS

| | | | |
|---|---|---|---|
| 9,092,248 B1 | 7/2015 | Makin et al. | |
| 9,256,725 B2 | 2/2016 | Oprea et al. | |
| 9,311,375 B1 | 4/2016 | Naik | |
| 9,632,875 B2* | 4/2017 | Raichstein | G06F 16/174 |
| 9,658,925 B1 | 5/2017 | Damodharan et al. | |
| 9,678,965 B1* | 6/2017 | Wartnick | G06F 11/1464 |
| 9,740,577 B1 | 8/2017 | Chakraborty et al. | |
| 9,977,704 B1 | 5/2018 | Chopra et al. | |
| 10,061,657 B1 | 8/2018 | Chopra et al. | |
| 10,146,636 B1* | 12/2018 | Ghare | G06F 11/263 |
| 10,216,583 B1 | 2/2019 | Krinke | |
| 10,339,012 B2 | 7/2019 | Hegdal | |
| 10,353,619 B1* | 7/2019 | Jha | G06F 3/065 |
| 2004/0098423 A1 | 5/2004 | Chigusa | |
| 2007/0239755 A1 | 10/2007 | Mahoney | |
| 2008/0244601 A1 | 10/2008 | Zeis | |
| 2009/0320029 A1 | 12/2009 | Kottomtharayil | |
| 2010/0122248 A1 | 5/2010 | Robinson et al. | |
| 2010/0257523 A1 | 10/2010 | Frank | |
| 2011/0271150 A1* | 11/2011 | Bourne | G06F 11/0748 714/47.3 |
| 2012/0078846 A1* | 3/2012 | Gold | G06F 11/1458 707/644 |
| 2012/0150996 A1* | 6/2012 | DuBois | H04L 67/2847 709/217 |
| 2014/0059209 A1 | 2/2014 | Alnoor | |
| 2014/0095817 A1 | 4/2014 | Hsu et al. | |
| 2015/0154039 A1* | 6/2015 | Zada | G06F 9/5011 718/1 |
| 2015/0234713 A1* | 8/2015 | Shimada | G06F 11/20 714/19 |
| 2016/0048408 A1* | 2/2016 | Madhu | G06F 11/2023 718/1 |
| 2016/0232061 A1* | 8/2016 | Gaschler | G06F 11/1461 |
| 2016/0371153 A1* | 12/2016 | Dornemann | G06F 11/1461 |
| 2017/0277597 A1* | 9/2017 | Dillon | G06F 11/1453 |
| 2018/0032409 A1* | 2/2018 | Surakanti | G06F 9/45558 |
| 2018/0039418 A1* | 2/2018 | Allen | G06F 3/065 |
| 2018/0143990 A1 | 5/2018 | Figueroa et al. | |
| 2018/0225311 A1 | 8/2018 | Bandopadhyay et al. | |
| 2018/0314600 A1* | 11/2018 | Mori | G06F 11/1456 |
| 2019/0129711 A1* | 5/2019 | Stopa | H04L 41/0853 |
| 2019/0286530 A1* | 9/2019 | Talley | G06F 11/1464 |
| 2020/0007620 A1 | 1/2020 | Das et al. | |
| 2020/0110638 A1* | 4/2020 | Asthana | G06F 11/3414 |
| 2020/0183652 A1 | 6/2020 | Krebs et al. | |
| 2020/0286103 A1* | 9/2020 | Sullivan | G06Q 30/0201 |
| 2020/0288206 A1* | 9/2020 | Bist | H04N 21/4223 |
| 2020/0341851 A1 | 10/2020 | Rana | |
| 2021/0004400 A1* | 1/2021 | Elkaim | G06F 17/16 |

OTHER PUBLICATIONS

Extended European Search Report issued in corresponding European Application No. 20168729.0, dated Sep. 8, 2020.
Extended European Search Report issued in corresponding European Application No. 20169836.2, dated Sep. 8, 2020.

* cited by examiner

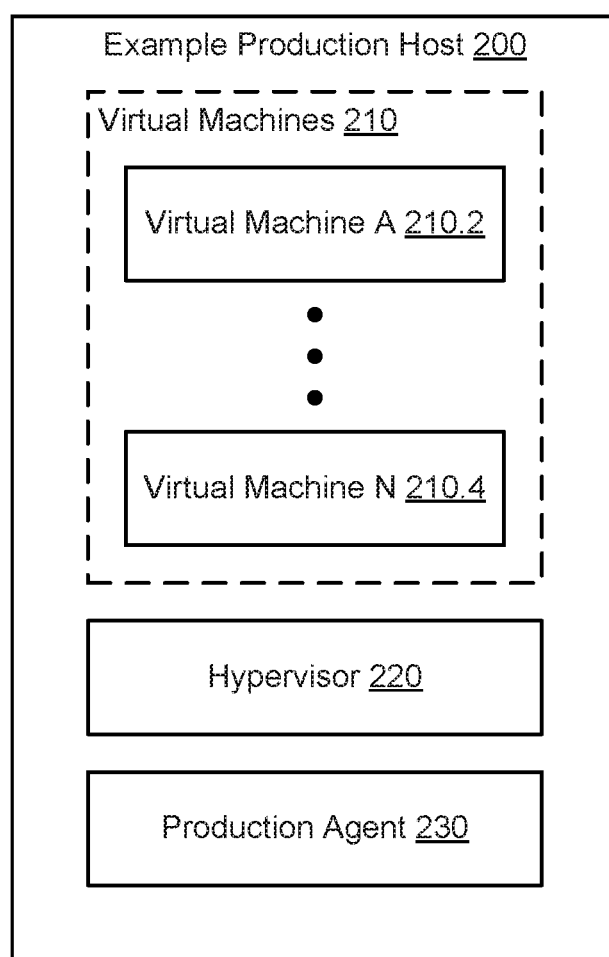
FIG. 2.1

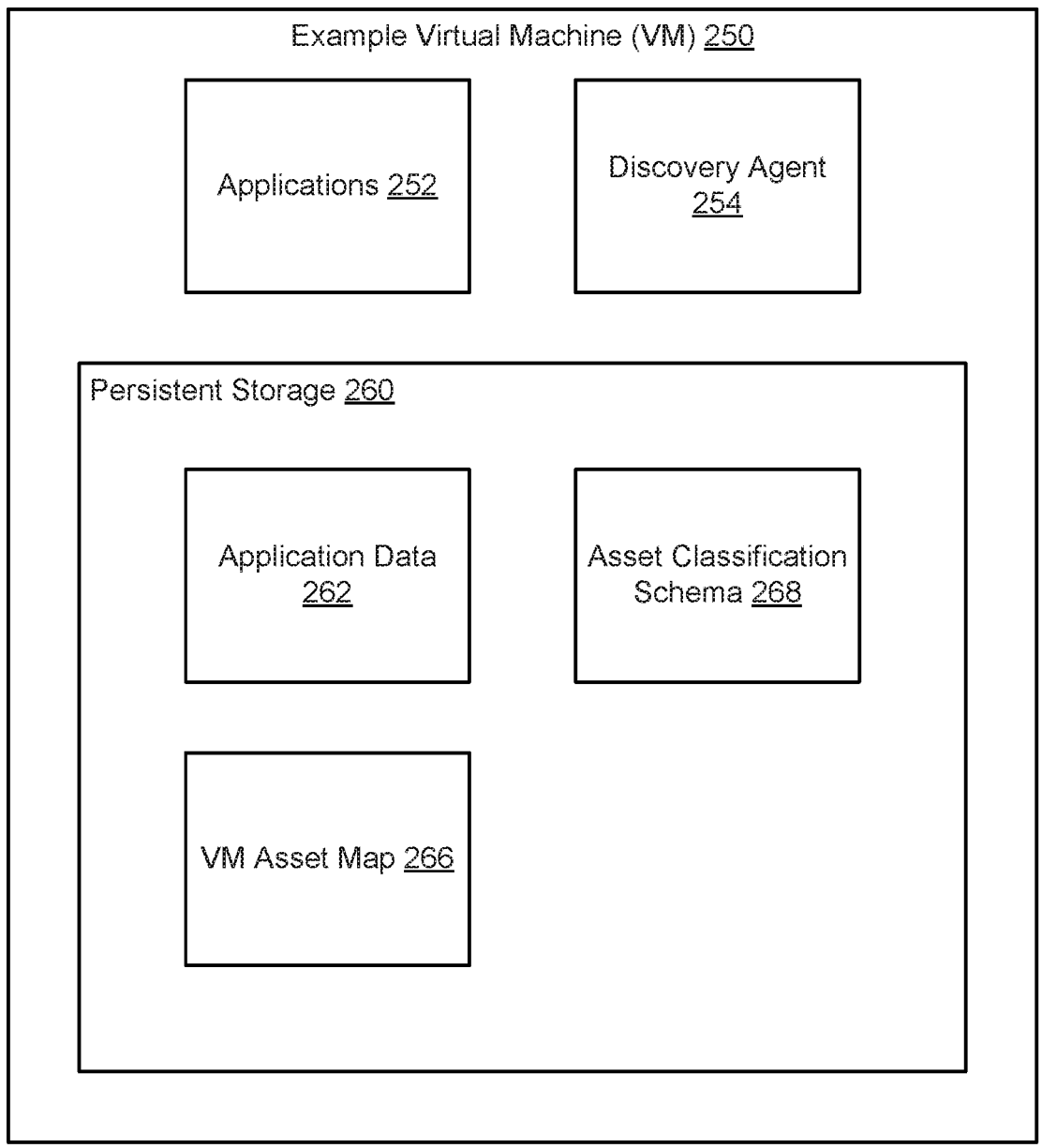
FIG. 2.2

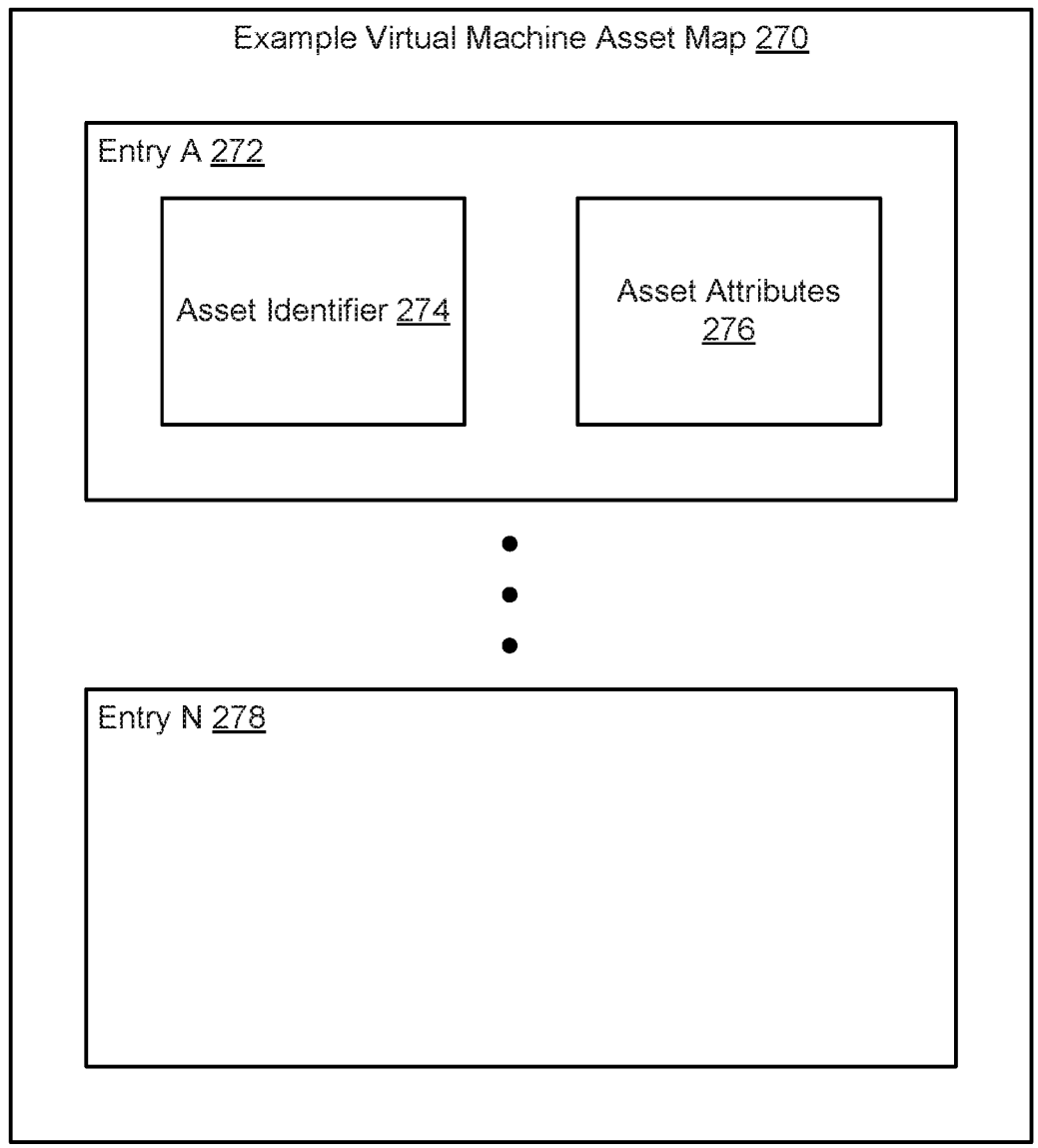
FIG. 2.3

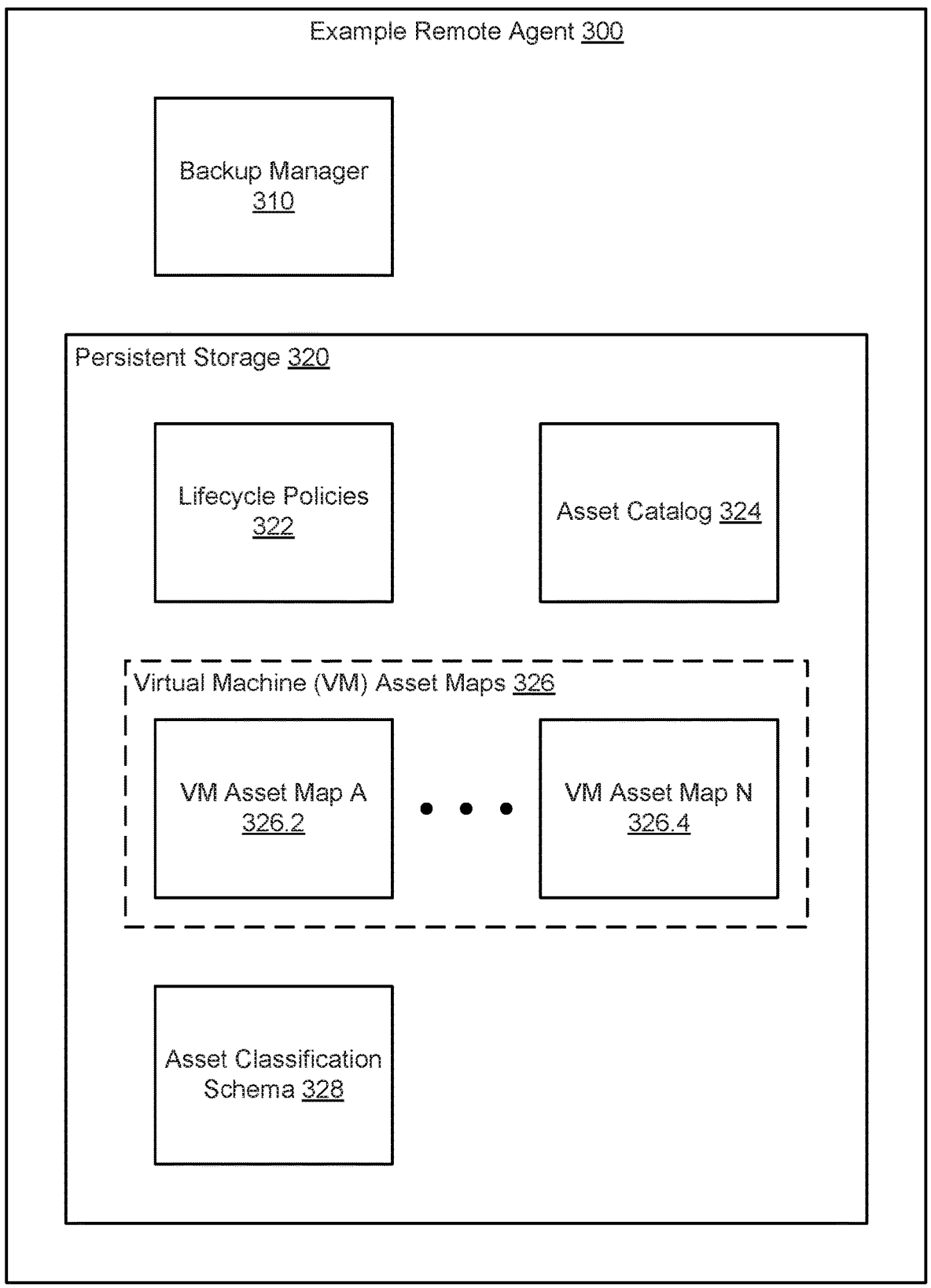
FIG. 3.1

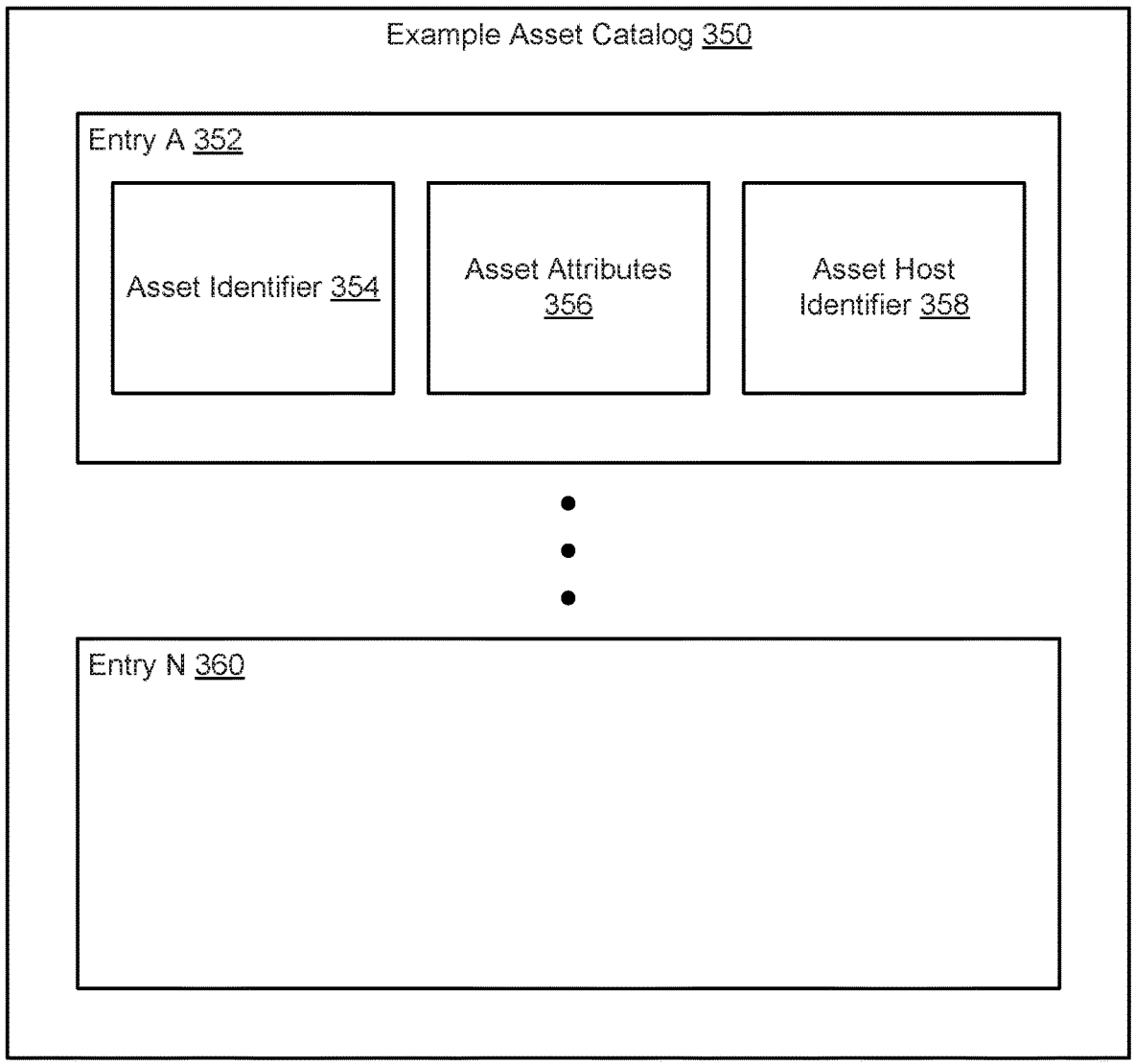
FIG. 3.2

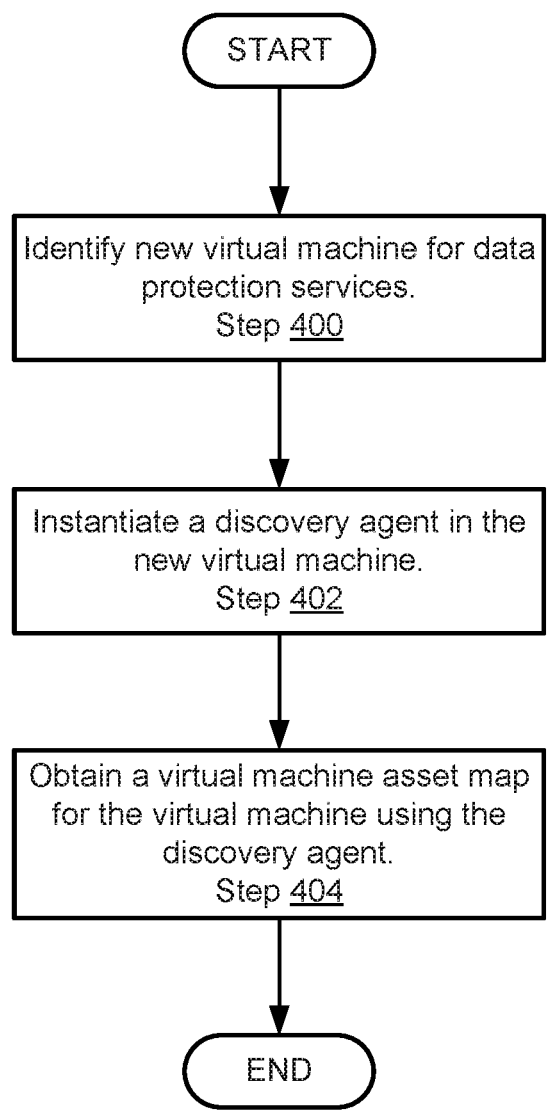
FIG. 4.1

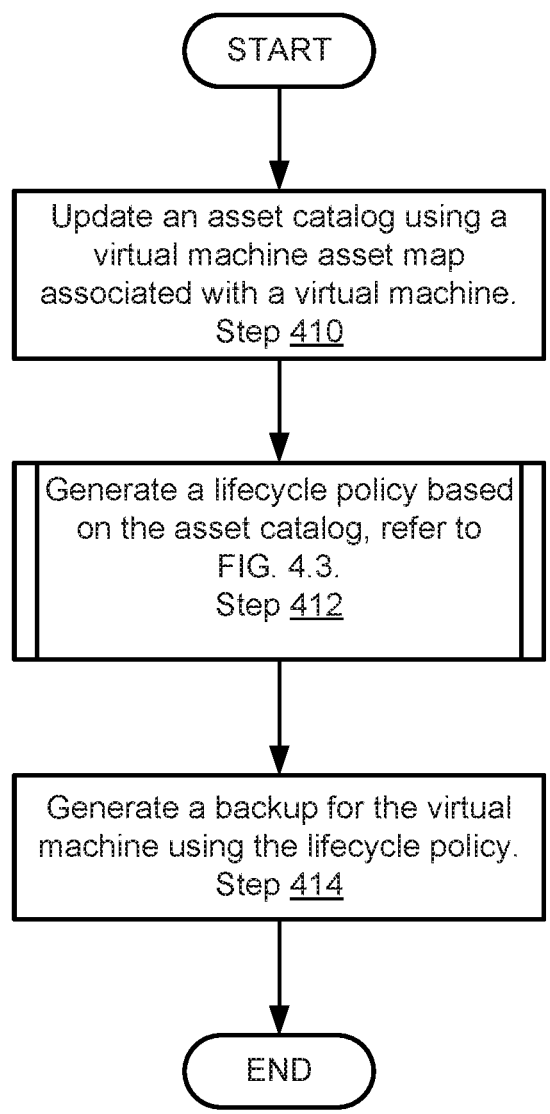
FIG. 4.2

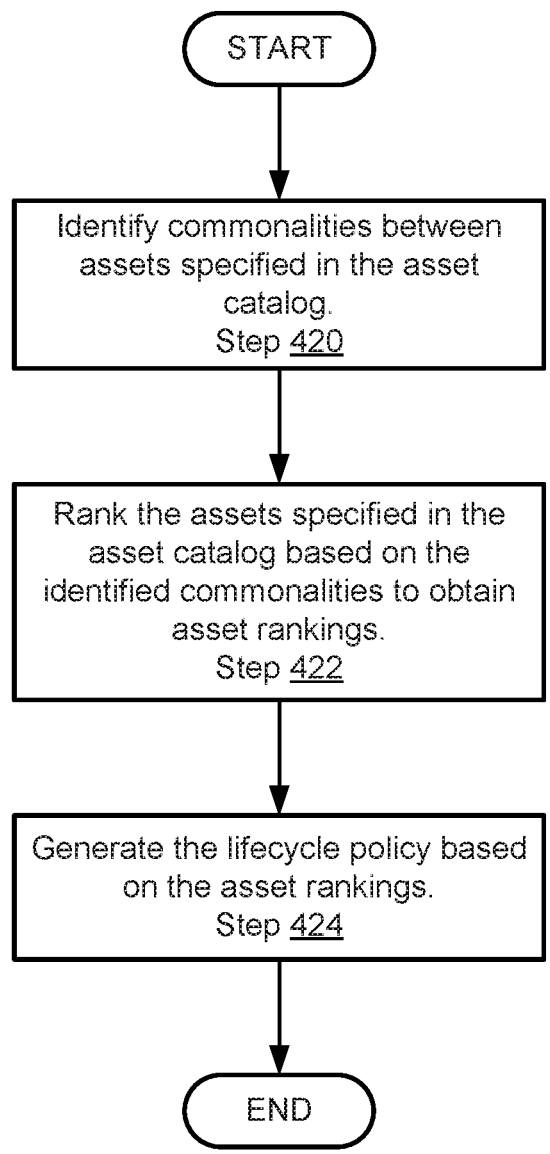
FIG. 4.3

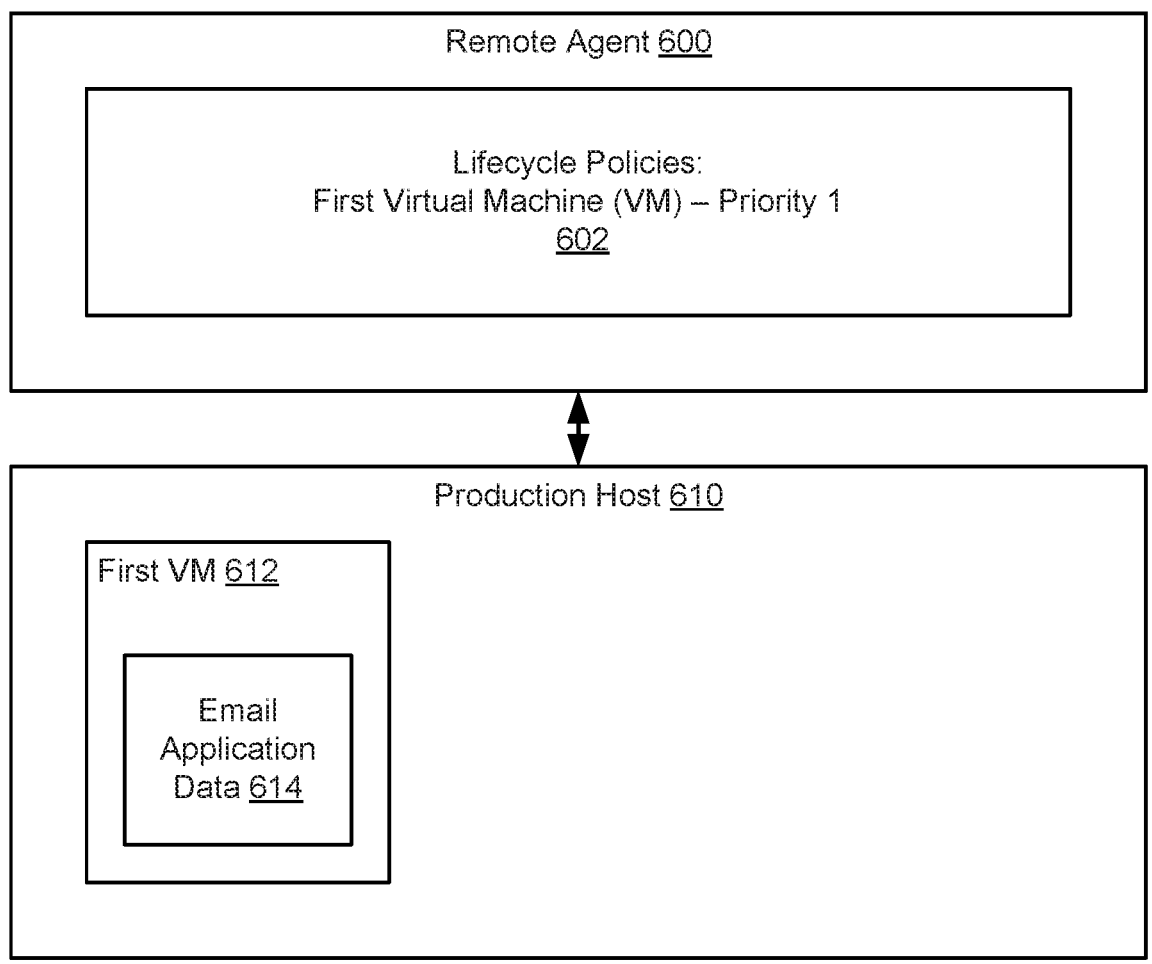
FIG. 6.1

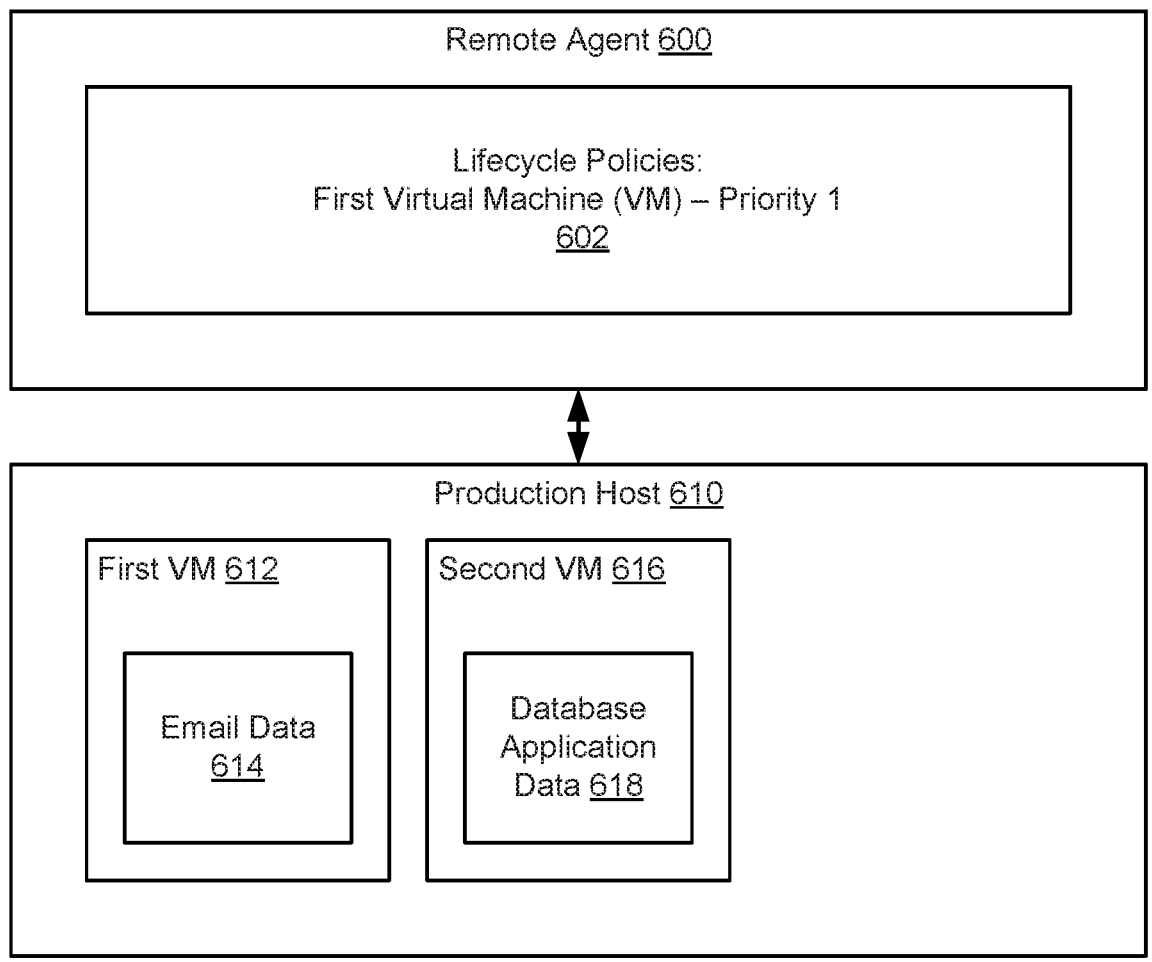
FIG. 6.2

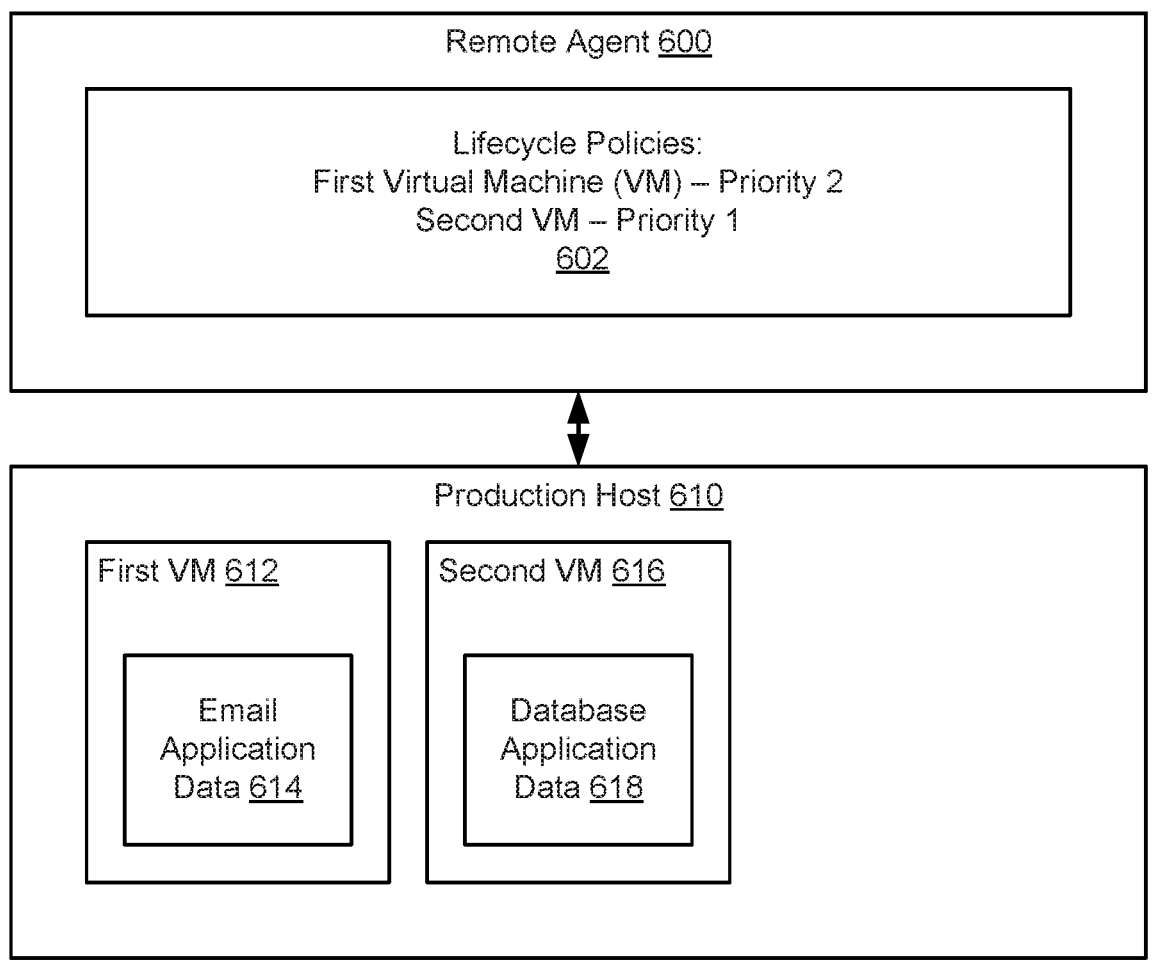
FIG. 6.3

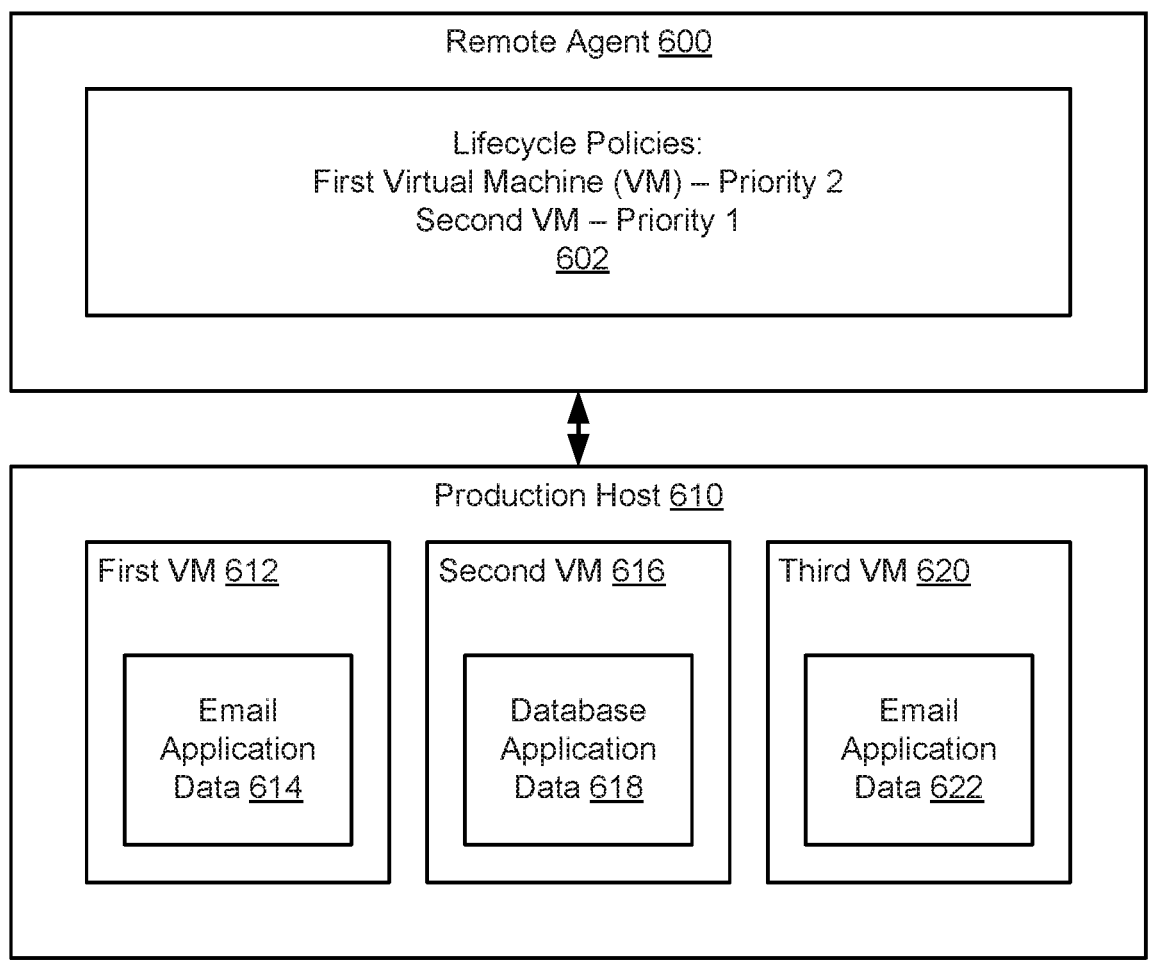
FIG. 6.4

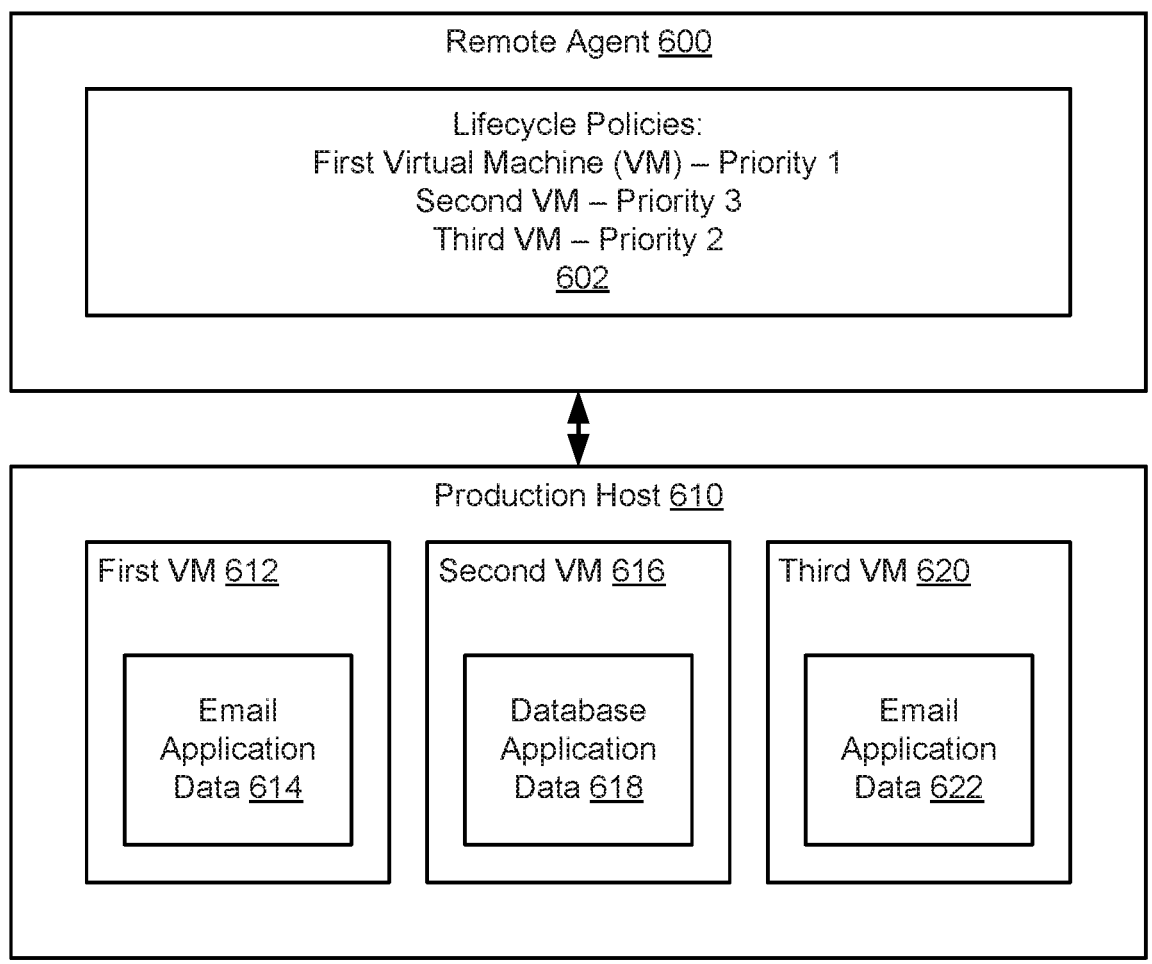
FIG. 6.5

SYSTEM AND METHOD FOR MANAGEMENT OF LARGESCALE DATA BACKUP

BACKGROUND

Computing devices may generate data during their operation. For example, applications hosted by the computing devices may generate data used by the applications to perform their functions. Such data may be stored in persistent storage of the computing devices. Failure of the persistent storage may result in data loss.

Different types of data may be more important than other types of data. For example, it may be less disadvantageous, from a user's perspective, to lose an unimportant image file than to lose electronic communications. Determining whether one piece of data is more important than another piece of data may depend on many factors.

SUMMARY

In one aspect, a remote agent for providing data protection services in accordance with one or more embodiments of the invention includes persistent storage and a backup manager. The persistent storage stores lifecycle policies. The backup manager updates an asset catalog using an asset map associated with a virtual machine; generates a lifecycle policy of the lifecycle policies using the asset catalog; and generates a backup for the virtual machine using the lifecycle policy. The lifecycle policy prioritizes generating the backup for the virtual machine over generating a second backup for a second virtual machine.

In one aspect, a method for providing data protection services based on lifecycle policies in accordance with one or more embodiments of the invention includes updating an asset catalog using an asset map associated with a virtual machine; generating a lifecycle policy of the lifecycle policies using the asset catalog; and generating a backup for the virtual machine using the lifecycle policy. The lifecycle policy prioritizes generating the backup for the virtual machine over generating a second backup for a second virtual machine.

In one aspect, a non-transitory computer readable medium in accordance with one or more embodiments of the invention includes computer readable program code, which when executed by a computer processor enables the computer processor to perform a method for providing data protection services based on lifecycle policies. The method includes updating an asset catalog using an asset map associated with a virtual machine; generating a lifecycle policy of the lifecycle policies using the asset catalog; and generating a backup for the virtual machine using the lifecycle policy. The lifecycle policy prioritizes generating the backup for the virtual machine over generating a second backup for a second virtual machine.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example production host in accordance with one or more embodiments of the invention.

FIG. 2.2 shows a diagram of an example virtual machine in accordance with one or more embodiments of the invention.

FIG. 2.3 shows a diagram of an example virtual machine asset map in accordance with one or more embodiments of the invention.

FIG. 3.1 shows a diagram of an example remote in accordance with one or more embodiments of the invention.

FIG. 3.2 shows a diagram of an example asset catalog in accordance with one or more embodiments of the invention.

FIG. 4.1 shows a flowchart of a method of obtaining a virtual machine asset map in accordance with one or more embodiments of the invention.

FIG. 4.2 shows a flowchart of a method of generating a backup in accordance with one or more embodiments of the invention.

FIG. 4.3 shows a flowchart of a method of generating a lifecycle policy in accordance with one or more embodiments of the invention.

FIGS. 6.1-6.5 show a non-limiting example of a system in accordance with embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing data protection services in a distributed system. Specifically, embodiments of the invention may provide a system that prioritizes the generation of backups for different entities. The system may prioritize backup generation based on the relative importance of the data hosted by the different entities. By doing so, the system may reduce the likelihood of losing important data.

Additionally, embodiments of the invention may provide a method for prioritizing backup generation that distributes the computational workload for determining the prioritizations across multiple components of the distributed system. By doing so, the computational footprint of management entities such as remote agents primarily tasked with orchestrating generation and storage of backups may be reduced.

Figure 1:
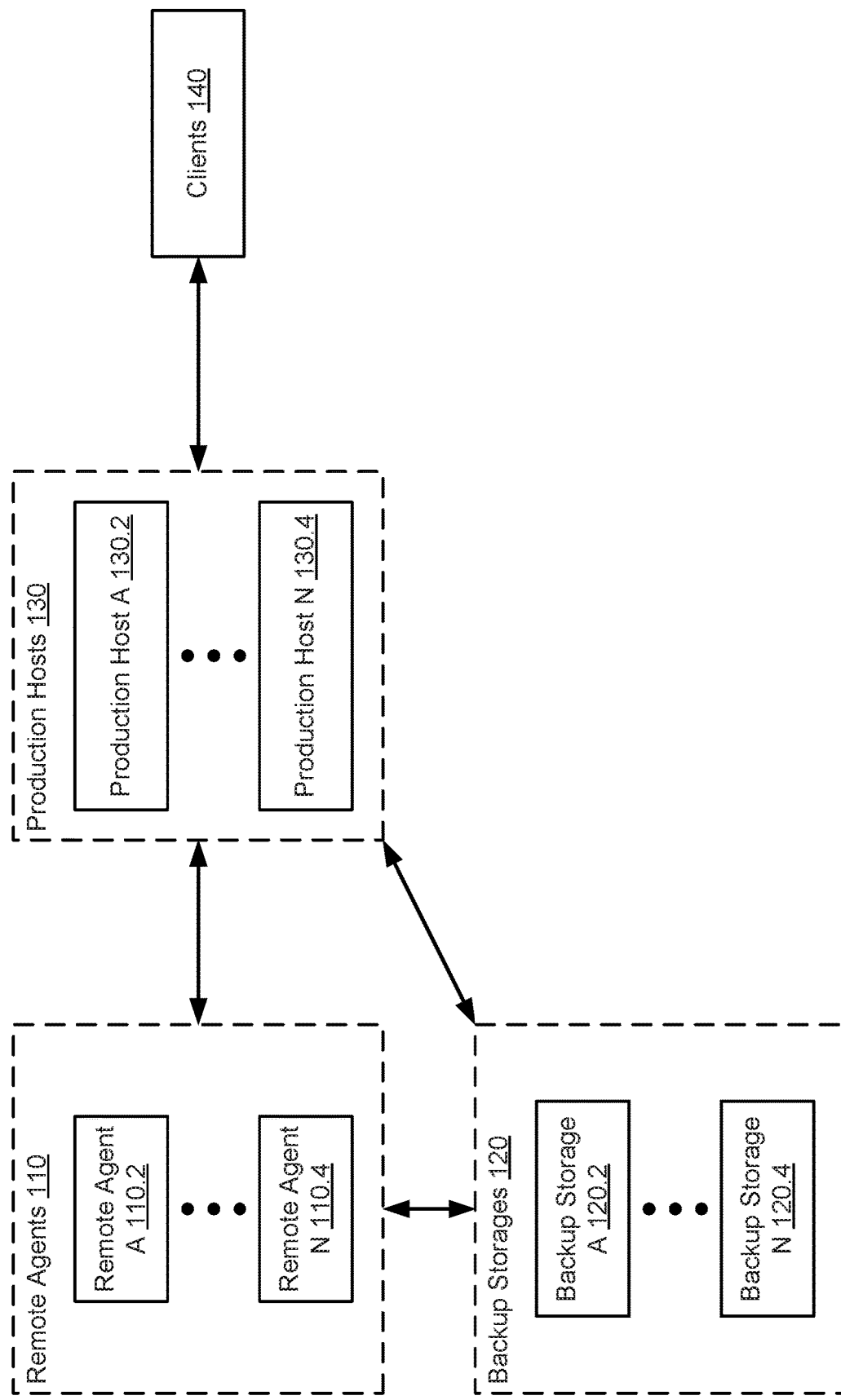
FIG. 1 shows a diagram of a system in accordance with one or more embodiments of the invention.

FIG. 1 shows an example system in accordance with one or more embodiments of the invention. The system may include clients (140) that obtain services from virtual machines and/or applications hosted by production hosts (130). For example, the production hosts (130) may host virtual machines that host applications. The clients (140) may utilize application services provided by the applications. The applications may be, for example, database applications, electronic communication applications, file storage applications, and/or any other type of application that may provide services to the clients (140). By utilizing such services, data that is relevant to the clients (140) may be stored in the production hosts (130).

To improve the likelihood that data stored in the production hosts (130) is available for future use, backups of the production hosts (130) may be generated and stored in the backup storages (120). A backup of one of the production hosts (130) may include data that may be used to restore all, or a portion, of the production host, or all, or a portion, of an entity hosted by the production host, to a previous state. Thus, if data hosted by one of the production hosts (130) is lost, access to the data may be restored by restoring all, or a portion, of the production host using information stored in the backup storages (120).

The system may also include remote agents (110) that provide data protection services to the production hosts (130). The data protection services may include orchestrating discovery of assets of the production hosts (130), developing protection strategies to protect the assets, generation of backups based on the data protection strategies, and storage of the backups in the backup storages based on the protection strategies.

In one or more embodiments of the invention, the remote agents (110) are resource lite entities. That is, the remote agents (110) may be designed to minimize their computing resource consumption footprint. To provide their functionality while minimizing their computing resource footprint, the remote agents (110) may offload computationally expensive tasks associated with asset discovery, asset characterization, and backup generation and storage to other entities of the system of FIG. 1. The remote agents (110) may orchestrate such offloading in a manner that ensures that data protection services are provided uniformly and consistently across the system of FIG. 1.

The components of the system illustrated in FIG. 1 may be operably connected to each other and/or operably connected to other entities (not shown) via any combination of wired and/or wireless networks. Each component of the system illustrated in FIG. 1 is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 4.1-5. The clients (140) may be other types of computing devices without departing from the invention. For additional details regarding computing devices, refer to FIG. 7.

The clients (140) may be logical devices without departing from the invention. For example, the clients (140) may be virtual machines that utilize computing resources of any number of physical computing devices to provide the functionality of the clients (140). The clients (140) may be other types of logical devices without departing from the invention.

In one or more embodiments of the invention, the clients (140) utilize application services provided by the production hosts (130). For example, the clients (140) may utilize database services, electronic communication services, file storage services, or any other type of computer implemented service provided by applications hosted by the production hosts (130). By utilizing the aforementioned services, data that is relevant to the clients (140) may be stored as part of application data of the applications hosted by the production hosts (130).

For example, consider a scenario in which a client utilizes file storage services, provided by an application hosted by the production hosts (130), by uploading an image to an application hosted by the production hosts (130). In response to receiving the uploaded image, the application may store a copy of the image locally in the production hosts (130). At a future point in time, the client that uploaded the image, or another entity, may desire to retrieve a copy of the image from the production hosts (130) and thereby render data, i.e., the copy of the image sort of the production hosts (130), stored in the production hosts (130) to be relevant to the clients (140). One or more embodiments of the invention may improve the likelihood that data that is relevant to the clients (140) and stored in the production hosts (130) is retrievable from the production hosts (130) at future points in time. Embodiments of the invention may provide such functionality by generating and storing backups of the production hosts, or a portion of the production hosts, in the backup storages (120).

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 4.1-5. The production hosts (130) may be other types of computing devices without departing from the invention. For additional details regarding computing devices, refer to FIG. 7.

In one or more embodiments of the invention, the production hosts (130) are distributed computing devices. As used herein, a distributed computing device refers to functionality provided by a logical device that utilizes the computing resources of one or more separate and/or distinct physical computing devices. For example, in one or more embodiments of the invention, the production hosts (130) may be distributed devices that include components distributed across any number of separate and/or distinct computing devices. In such a scenario, the functionality of the production hosts (130) may be performed by multiple, different computing devices without departing from the invention.

A system in accordance with one or more embodiments of the invention may include any number of production hosts (e.g., 130.2, 130.4) without departing from the invention. For example, a system may include a single production host (e.g., 130.2) or multiple production hosts (e.g., 130.2, 130.4).

In one or more embodiments of the invention, the production hosts (130) provide services to the clients (140). The services may be any type of computer implemented service such as, for example, database services, electronic communication services, data storage services, and/or instant messaging services. When providing such services to the clients (140), data that is relevant to the clients (140) may be stored in persistent storage of the production hosts (130).

In one or more embodiments of the invention, the production hosts (130) perform backup services (in accordance with data protection strategies orchestrated by the remote agents (110)) such as, for example, generating and storing backups in backup storages (120). By storing the backups in the backup storages (120), copies of data stored in persistent storage of the production hosts (130) may be redundantly stored in the backup storages (120). By redundantly storing copies of data in both the production hosts (130) and the backup storages (120), it may be more likely that the stored data will be able to be retrieved at a future point in time. For example, if a production host (e.g., 130.2) suffers a catastrophic failure or other type of data loss/corruption event, the data on the production host's persistent storage may be lost. However, because a copy of the data may be stored in the backup storages (120), it may be possible to retrieve the data for use after the catastrophic failure. Thus, embodiments of the invention may improve the reliability of data storage in a distributed system.

Backup services may also include discovering assets of the production hosts (130) for data protection strategy development purposes. An asset may be a data structure hosted by the production hosts (130). Production hosts (130) may include any number of assets. Different production hosts (130) may include different, or the same, numbers of assets.

Due to limited computing resources of the production hosts, it may not be possible to generate backups that will provide protection for all of the assets of one of the production hosts (130) at the same time. Further, some assets of the production hosts (130) may be more important than other assets. To improvise the likelihood that more important assets are protected over lesser important assets, backup generation for the production hosts (130) may be prioritized based on the relative importance of the assets of the production hosts (130).

To facilitate prioritization of the assets, the production hosts (130) may characterize the assets. Characterizing the assets may provide asset attributes associated with each of the assets. The production hosts (130) may provide information regarding the discovered assets and/or the asset attributes to the remote agents (110) to facilitate the development of data protection strategies. For additional details regarding the production hosts (130), refer to FIG. 2.1.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the backup storages (120) described through this application and all, or a portion, of the methods illustrated in FIGS. 4.1-5. The backup storages (120) may be other types of computing devices without departing from the invention. For additional details regarding computing devices, refer to FIG. 7.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) are distributed devices that include components distributed across any number of separate and/or distinct computing devices. In such a scenario, the functionality of the backup storages (120) may be performed by multiple, different computing devices without departing from the invention.

In one or more embodiments of the invention, the backup storages (120) provide data storage services to the production hosts (130). The data storage services may include storing of data provided by the production hosts (130) and providing of previously stored data to the production hosts (130). Such provided data may be used for restoration (and/or other) purposes. The system may include any number of backup storages (e.g., 120.2, 120.4) without departing from the invention. For example, the system in accordance with embodiments of the invention may only include a single backup storage (e.g., 120.2) or may include multiple backup storages (e.g., 120.2, 120.4).

In one or more embodiments of the invention, the data stored by the backup storages (120) includes backups of virtual machines hosted by the production hosts (130). For example, the production hosts (130) may host a virtual machine that hosts a database application. To generate backups of the database, a backup of the virtual machine hosting the database may be generated and the backup may be sent to the backup storages (120) for storage. At a future point in time, it may become desirable to restore the state of the database managed by the database application to a previous state. To do so, the previously stored backup of the virtual machine stored in the backup storages (120) may be retrieved. The retrieved backup may be used to restore the application data hosted by the virtual machine hosting the database to a state associated with the backup, i.e., the desired previous state.

While described above as storing backups of virtual machines, the backup storages (120) may store other types of data from the production hosts (130), or other entities, without departing from the invention. For example, the backup storages (120) may store archives or other data structures from the clients (140) and/or other entities.

In one or more embodiments of the invention, the remote agents (110) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to provide the functionality of the remote agents (110) described through this application and all, or a portion, of the methods illustrated in FIGS. 4.1-5. The remote agents (110) may be other types of computing devices without departing from the invention. For additional details regarding computing devices, refer to FIG. 7.

In one or more embodiments of the invention, the remote agents (110) are distributed computing devices. As used herein, a distributed computing device refers to functionality provided by a logical device that utilizes the computing resources of one or more separate and/or distinct computing devices. For example, in one or more embodiments of the invention, the remote agents (110) are distributed devices that include components distributed across any number of separate and/or distinct computing devices. In such a scenario, the functionality of the remote agents (110) may be performed by multiple, different computing devices without departing from the invention.

In one or more embodiments of the invention, the backup storages (120) provide the functionality of the remote agents. For example, the backup storages (120) may host applications that provide all, or a portion, of the functionality of the remote agents (110). The functionality of the remote agents (110) may be provided by other components of the system of FIG. 1 without departing from the invention.

In one or more embodiments of the invention, the remote agents (110) provide data protection services. Data protection services may include (i) identification and/or characterization of assets of the production hosts, (ii) generation of data protection strategies for the production hosts based on the assets of the production hosts, (iii) generation of backups for the production hosts in accordance with the data protection strategies. By doing so, the remote agents (110) may improve the likelihood that higher importance data stored in the production hosts (130) is available for future use when compared to other methods for providing data protection services. The system of FIG. 1 may include any number of remote agents (e.g., 110.2, 110.4). For additional details regarding remote agents, refer to FIG. 3.1.

While the system of FIG. 1 has been described and illustrated as including a limited number of components for the sake of brevity, a system in accordance with embodiments of the invention may include additional, fewer, and/or different components than those illustrated in FIG. 1 without departing from the invention.

As discussed above, production hosts may host virtual machines, applications, or other entities that provide services to the clients. FIG. 2.1 shows a diagram of an example production host (200) in accordance with one or more embodiments of the invention. The example production host (200) may be similar to any of the production hosts (130, FIG. 1). As discussed above, the example production hosts (200) may provide: (i) application services to the clients and (ii) backup services to the entities that provide the application services to the clients.

To provide the aforementioned functionality of the example production host (200), the example production host (200) may include virtual machines (210), a hypervisor (220), and a production agent (230). Each component of the example production host (200) is discussed below.

The virtual machines (210) may be applications. For example, the virtual machines (210) may be applications executing using physical computing resources of the example production host (200) and/or other entities. In other words, each of the virtual machines (210) may be implemented as computer instructions stored on a persistent storage that when executed by a processor of the example production host (200) and/or other entities give rise to the functionality of the respective virtual machine. The example production host (200) may host any number of virtual machines (e.g., 210.2, 210.4) without departing from the invention.

Each of the virtual machines (210) may host any number of applications. The applications may provide application services to clients or other entities. For example, the applications may be database applications, electronic communication applications, filesharing applications, and/or other types of applications. Each of the virtual machines (210) may host any number of applications without departing from the invention.

Each of the applications may perform similar or different functions. For example, a first application may be a database application and a second application may be an electronic communications application. In another example, a first application may be a first instance of a database application and a second application may be a second instance of the database application.

In one or more embodiments of the invention, all, or a portion, of the applications provide application services to clients. The provided services may correspond to the type of application of each of the applications. When providing application services to the clients, data that is relevant to the clients may be received by and/or generated by the applications. The applications may store such relevant data as part of the application data associated with respective applications in persistent storage of the example production host (200) and/or other entities.

In some embodiments of the invention, portions, or all, of the application data may be stored remotely from the example production host (200). For example, the application data may be stored in a second production host, a backup storage, or another entity, that does not host the applications. In some cases, the application data may be spanned across multiple entities or multiple copies of the application data may be stored in multiple virtual machines to facilitate cooperative action by multiple instances of an application that are hosted by multiple virtual machines. The application data may be stored in other locations without departing from the invention.

While the applications have been described above as being hosted by the virtual machines (210), the applications may not be hosted by virtual machines without departing from the invention. For example, the applications may be executing natively on the example production host (200) rather than in a virtualized entity, e.g., one of the virtual machines (210).

The application data hosted by the virtual machines (210) may be the assets. As will be discussed in greater detail below, each of the virtual machines (210) may inventory their data to identify assets, characterize the assets to identify attributes of the assets, and provide such information to remote agents for data protection strategy formulation purposes. For additional details regarding the virtual machines (210), refer to FIG. 2.2.

The hypervisor (220) may manage execution of the virtual machines (210). The hypervisor (220) may instantiate and/or terminate any of the virtual machines (210). The hypervisor (220) may also allocate computing resources of the example production host (200) to each of the virtual machines (e.g., 210.2, 210.4).

For example, the hypervisor (220) may allocate a portion of the persistent storage of the example production host (200). Any quantity of storage resources of the persistent storage may be allocated in any manner among the virtual machines (e.g., 210.2, 210.4).

While discussed with respect to storage resources, the hypervisor (220) may allocate other types of computing resources to the virtual machines (210), and/or other entities hosted by the example production host (200), without departing from the invention. For example, the hypervisor (220) may allocate processor cycles, memory capacity, memory bandwidth, and/or network communication bandwidth among the virtual machines (210) and/or other entities hosted by the example production host (200).

In one or more embodiments of the invention, the hypervisor (220) is a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented as computing code stored on a persistent storage that when executed by a processor performs the functionality of the hypervisor (220). The processor may be a hardware processor including circuitry such as, for example, a central processing unit or a microcontroller. The processor may be other types of hardware devices for processing digital information without departing from the invention.

The production agent (230) may locally manage provisioning of backup services to the virtual machines (210) and/or entities hosted by the virtual machines (210). For example, the production agent (230) may orchestrate the generation of backups and storage of the generated backups in backup storages (120, FIG. 1). To orchestrate the generation of backups, the production agent (230) may generate virtual machine level backups. A virtual machine level backup may be a backup that represents the state (or difference from one state to another state) of a virtual machine at a point in time.

In one or more embodiments of the invention, the production agent (230) manages the provisioning of backup services for the virtual machines (210) based on instructions received from one or more remote agents. These instructions may cause the production agent (230) to take action to provide the backup services. In other words, the production agents (230) may orchestrate data protection services including generation of backups, performance of restorations across the system, and/or provide remote access to application data extracted from the backups stored in the backup storages.

In one or more embodiments of the invention, the production agent (230) prioritizes generating backups of the virtual machines (210) based on instructions obtained from one or more remote agents. For example, the remote agent may instruct the production agent (230) to generate and store backups of some or all of the virtual machines (210) and to store such backups in backup storage. The remote agent may also specify an ordering for generating the backups of the virtual machines. In response to receiving such instructions, the production agent (230) may generate backups for the virtual machines (210) in the order specified by the remote agent. By doing so, backup generation may be prioritized.

In one or more embodiments of the invention, the production agent (230) includes functionality to report its activities to the remote agents. For example, the production agent (230) may monitor backups that are generated and send notifications of the generated backups to the remote agents. The notifications sent by the production agent (230) may include information regarding the type of backup generated, the storage location of the generated backup, and/or any other information regarding the generated and stored backups that may be relevant for data protection services provided by the remote agents. By doing so, remote agents may be notified of the backup generations for the entities hosted by the example production host (200).

The production agent (230) may also provide restoration services. Restoration services may enable entities that are now inaccessible due to, for example, failure of a host entity such as a production host to be instantiated in other locations and being in predetermined states. To provide restoration services, the production agent (230) may obtain any number of backups from backup storage and restore the entity using the backups. For example, a production agent (230) may obtain a virtual machine level backup and instantiate a copy of a virtual machine using the obtained backup. By doing so, a virtual machine may be restored in a state hosting an application in a predetermined state. Once in the predetermined state, the application may provide desired application services and/or enable access to application data of the application. Entities may be restored to different, desirable states using different combinations of previously generated backups and/or a portion of the backups.

To provide the above noted functionality of the production agent (230), the production agent (230) may perform all, or a portion, of the methods illustrated in FIGS. 4.1-5.

In one or more embodiments of the invention, the production agent (230) is a hardware device including circuitry. The production agent (230) may be, for example, a digital signal processor, a field programmable gate array, or an application specific integrated circuit. The production agent (230) may be other types of hardware devices without departing from the invention.

In one or more embodiments of the invention, the production agent (230) is implemented as computing code stored on a persistent storage that when executed by a processor performs the functionality of the production agent (230). The processor may be a hardware processor including circuitry such as, for example, a central processing unit or a microcontroller. The processor may be other types of hardware devices for processing digital information without departing from the invention.

While the example production host (200) of FIG. 2.1 has been described and illustrated as including a limited number of components for the sake of brevity, a production host in accordance with embodiments of the invention may include additional, fewer, and/or different components than those illustrated in FIG. 2.1 without departing from the invention.

As discussed above, virtual machines hosted by the production hosts may provide services to clients. FIG. 2.2 shows a diagram of an example virtual machine (250) in accordance with one or more embodiments of the invention.

The example virtual machine (250) may include application (252), a discovery agent (254), and persistent storage (260). Each component of the example virtual machine (250) is discussed below.

As discussed above, the applications (252) may provide application services to clients and/or other entities. The applications (252) may be implemented as computer instructions, e.g., computer code, that when executed by a processor of the example virtual machine (250) gives rise to the functionality of the applications (252).

When providing application services to the clients and/or other entities, the applications (252) may generate application data (262) stored in the persistent storage (260). The application data (262) may include any number of assets. As discussed above, an asset may be a data structure. Each of the assets of the application data (262) may be associated with a corresponding application of the applications (252). For example, a database of the application data (262) may be associated with a database application of the applications (252). The application data (262) may include any number of assets associated with corresponding applications without departing from the invention.

The discovery agent (254) may provide asset discovery services. Asset discovery services may include (i) identifying assets of the application data (262) using an asset classification schema (268), (ii) characterizing the assets using the asset classification schema (268) to identify attributes of each of the assets, (iii) generating a virtual machine asset map (266) based on the assets and/or the attributes of the assets, and (iv) providing the virtual machine asset map to remote agents. The discovery agent (254) may be instantiated by remote agents to obtain the virtual machine asset map (266). The functionality of the discovery agent (254) may be invoked by the remote agents to orchestrate the identification and characterization of the assets of the example virtual machine (250).

Figure 5:
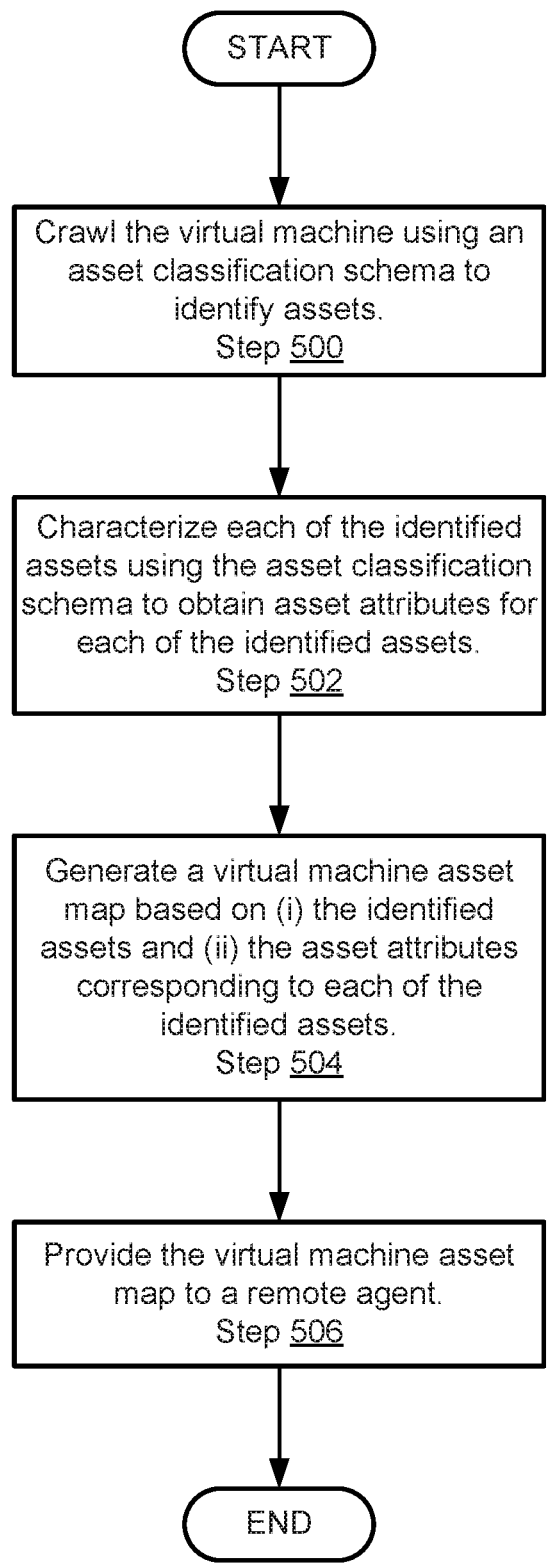
FIG. 5 shows a flowchart of a method of responding to a virtual machine asset map request in accordance with one or more embodiments of the invention.

To provide the above noted functionality of the discovery agent (254), the discovery agent may perform all, or a portion, of the method illustrated in FIG. 5.

In one or more embodiments of the invention, the discovery agent (254) is implemented as computing code stored on a persistent storage (e.g., 260) that when executed by a processor performs the functionality of the discovery agent (254). The processor may be a hardware processor including circuitry such as, for example, a central processing unit or a microcontroller. The processor may be other types of hardware devices for processing digital information without departing from the invention.

In one or more embodiments of the invention, the persistent storage (260) is a logical storage (e.g., virtualized storage) that utilizes any quantity of hardware storage resources of a production host (and/or other entity) that hosts the example virtual machine (250). For example, the persistent storage (260) may utilize portions of any combination of hard disk drives, solid state disk drives, tape drives, and/or any other physical storage medium of a production host and/or other entity for providing storage resources. Such storage resources of the persistent storage (260) may be used to host the application data (262), the asset classification schema (268), the virtual machine asset map (266), and/or other data structures. Each of these data structures is discussed below.

As discussed above, the application data (262) may be a data structure for storing data generated, maintained, and/or used by the applications (252). The application data (262) may be any type of data. The application data (262) may be logically divided into assets. Each of the assets to be associated with one or more of the applications (252). The associations between the assets and the applications (252) may represent that the associated applications (252) use, generate, and/or maintain the assets.

The asset classification schema (268) may be a data structure that stores information used to (i) identify assets of the application data (262) and/or (ii) characterize the assets of the application data (262) to obtain attributes of each of the assets. The asset classification schema (268) may be provided by remote agents and/or other entities.

In one or more embodiments of the invention, the asset classification schema (268) includes a list of types of assets. List of types of assets may specify characteristics of each of the types of assets that may be used to identify assets of the application data (262) that correspond to each of the types of assets.

For example, the list of the types of assets may specify an organizational structure of the data of assets that correspond to each of the types of assets. In another example, a list of the types of assets may specify an identifier of the assets that correspond to each of the types of assets. The characteristics of each asset type may be other types of asset characteristics without departing from the invention.

In one or more embodiments of the invention, the asset classification schema (268) includes a list of rules for each of the types of assets for determining different attributes of the assets. For example, an attribute of an asset may be a frequency of use of the asset. The rule corresponding to the attribute of the asset may be to sample the frequency of use of the asset over a predetermined period of time to identify the attribute of the asset. In another example, a second attribute of the asset may be an average quantity of data of the asset. The second rule corresponding to the second attribute of the asset may be to sample the size of the asset over a predetermined period of time to identify the attribute of the asset. The discovery agent (254) may perform actions in accordance with the corresponding rule to identify an attribute of an asset.

Attributes of an asset may include one or more of the following: (i) a transaction rate for the asset, (ii) the number of entities that transact with the asset, (iii) the quantity of data included in the asset, (iv) an average transaction rate for the asset, (v) a maximum transaction rate for the asset, and/or (vi) a minimum transaction rate for the asset. The attributes of the asset may include different attributes than those listed without departing from the invention.

The virtual machine asset map (266) may be a data structure that includes information regarding the assets and the attributes of the assets of a virtual machine. For additional details regarding virtual machine asset maps, refer to FIG. 2.3.

While the example virtual machine (250) of FIG. 2.2 has been described and illustrated as including a limited number of components for the sake of brevity, a virtual machine in accordance with embodiments of the invention may include additional, fewer, and/or different components than those illustrated in FIG. 2.2 without departing from the invention.

As discussed above, virtual machine asset maps may be used by remote agents to prioritize the generation of backups. FIG. 2.3 shows a diagram of an example virtual machine asset map (270) in accordance with one or more embodiments of the invention. The example virtual machine asset map (270) may be a data structure for storing information regarding assets of a virtual machine.

The example virtual machine asset map (270) may include any number of entries (e.g., 272, 278) for storing information regarding a corresponding asset. Each of the entries (e.g., 272, 278) may include an asset identifier (274) and asset attributes (276).

The asset identifier (274) may be information used to identify an asset associated with an entry (e.g., 272). The asset identifier (274) may be, for example, a name of the asset (e.g., a file name or other type of identifier). The asset identifier (274) may be used in conjunction with the asset identifiers of other entries of the example virtual machine asset map (270) to identify each of the assets of the virtual machine associated with the example virtual machine asset map (270).

The asset attributes (276) may be information used to discriminate the asset associated with the asset attributes (276) from other assets. For example, the asset attributes (276) may include one or more of the following: (i) a transaction rate for the asset, (ii) the number of entities that transact with the asset, (iii) the quantity of data included in the asset, (iv) an average transaction rate for the asset, (v) a maximum transaction rate for the asset, and/or (vi) a minimum transaction rate for the asset. The attributes of the asset may include different attributes than those listed without departing from the invention.

While the example virtual machine asset map (270) of FIG. 2.3 has been described as including a limited amount of specific information, the example virtual machine asset map (270) may include additional, different, and/or less information without departing from the invention. Additionally, while described as a list of entries (e.g., 272, 278), the example virtual machine asset map (270) may have a different organizational structure, other than a list, without departing from the invention. Further, the example virtual machine asset map (270) may be divided into any number of separate data structures and/or may be integrated into another data structure without departing from the invention.

As discussed above, remote agents may provide data protection services. FIG. 2.3 shows a diagram of an example remote agent (300) in accordance with one or more embodiments of the invention. The example remote agent (300) may include a backup manager (310) and persistent storage (320). Each of these components of the example remote agent (300) is discussed below.

The backup manager (310) may (i) orchestrate the discovery of assets of virtual machines, (ii) generate lifecycle policies (322) based on the assets of the virtual machines, and (iii) orchestrate the generation and storage of backups of the virtual machines in backup storages based on the lifecycle policies (322).

To discover assets of the virtual machines, the backup manager (310) may instantiate discovery agents in the virtual machines, generate virtual machine asset maps (326) of the virtual machines, and store the virtual machine asset maps (326) in the persistent storage (320). As discussed above, the virtual machine asset maps (326) may specify the assets and attributes of the assets of the virtual machines.

Using the virtual machine asset maps (326), the backup manager (310) may generate an asset catalog (324). The asset catalog (324) may include information regarding each of the virtual machines for which the example remote agent (300) provides data protection services. For additional details regarding the asset catalog (324), refer to FIG. 3.2.

To generate the lifecycle policies (322), the backup manager (310) may determine priorities for each of the virtual machines for which the example remote agent (300) provides data protection services using the asset catalog (324). The lifecycle policies (322) may be generated so that backups for the virtual machines for which the example remote agent (300) provides data protection services in an order based on the priorities of each of the virtual machines.

To orchestrate the generation and storage of backups of the virtual machines, the backup manager (310) may send instructions to the production hosts that cause backups of the virtual machines to be generated in accordance with the lifecycle policies (322). For example, the instructions may specify an order for generating backups for virtual machines hosted by each of the production hosts. Different instructions may be sent to different production hosts that reflect the virtual machines hosted by each of the respective production hosts.

To provide the above noted functionality of the backup manager (310), the backup manager (310) may perform all, or a portion, of the methods illustrated in FIGS. 4.1-5.

In one or more embodiments of the invention, the backup manager (310) is a hardware device including circuitry. The backup manager (310) may be, for example, a digital signal processor, a field programmable gate array, or an application specific integrated circuit. The backup manager (310) may be other types of hardware devices without departing from the invention.

In one or more embodiments of the invention, the backup manager (310) is implemented as computing code stored on a persistent storage that when executed by a processor performs the functionality of the backup manager (310). The processor may be a hardware processor including circuitry such as, for example, a central processing unit or a microcontroller. The processor may be other types of hardware devices for processing digital information without departing from the invention.

In one or more embodiments of the invention, the persistent storage (320) is a physical storage. The physical storage may include any combination of hard disk drives, solid state disk drives, tape drives, and/or any other physical storage mediums for the storage of data.

In one or more embodiments of the invention, the persistent storage (320) is a logical storage (e.g., virtualized storage) that utilizes any quantity of hardware storage resources of any number of computing devices for storing data. For example, the persistent storage (320) may utilize portions of any combination of hard disk drives, solid state disk drives, tape drives, and/or any other physical storage medium of any number of computing devices. The persistent storage (320) may store the lifecycle policies (322), the asset catalog (324), the virtual machine asset maps (326), and an asset classification schema.

The lifecycle policies (322) may be a data structure that includes information regarding data protection strategies. The data protection strategies may specify (i) a relative importance of generating backups of each virtual machine of any number of virtual machines, (ii) when backups for each virtual machines of any number of virtual machines are to be generated, (iii) where the generated backups are to be stored, (iv) how many copies of the backup are to be stored, and/or (v) other characteristics of the data protection strategies to be employed for any number of virtual machines.

For example, one of the lifecycle policies (322) may specify that a backup for a virtual machine is to be generated every 12 hours, that the generated backup is to be stored in a particular backup storage, and that generating the backup for the virtual machine has a priority of 42 on a 100 point scale. The priority for generating the backup for the virtual machine may be specified via other methods without departing from the invention. For example, the priority may be specified as being more important relative to an enumerated list of backups to be generated for other virtual machines. Or, in another example, the priority may be a list of other virtual machines which are deemed to be of lower importance than the virtual machine associated with the lifecycle policy which specifies the importance.

The asset catalog (324) may be a data structures that includes information regarding all of the assets and/or the asset attributes of the virtual machine for which the example remote agent (300) provides data protection services. The asset catalog (324) may reflect the information included in the virtual machine asset maps (326). For additional details regarding the asset catalog (324), refer to FIG. 3.2.

The virtual machine asset maps (326) may be data structures that include information regarding the assets and/or the asset attributes of corresponding virtual machines. There may be any number of virtual machine asset maps (e.g., 326.2, 326.4) in the persistent storage (320). The virtual machine asset maps (326) may be obtained from corresponding virtual machines. The virtual machine asset maps (326) may be deleted and/or retained once information from the respective virtual machine asset maps (326) are incorporated into the asset catalog (324). In some cases, only the virtual machine asset maps (326) are in the persistent storage (320). In other words, an asset catalog (324) may not be generated and the virtual machine asset maps (326) may be utilized in place of the asset catalog (324).

In some cases, multiple virtual machine asset maps (326) may be obtained from a virtual machine. The multiple virtual machine asset maps may be obtained at different points in time. For example, as the applications hosted by a virtual machine change, the virtual machine asset map for the virtual machine may be needed to be generated to accurately reflect the assets included in the virtual machine after the application hosted by the virtual machine change. Thus, as the state of the virtual machine changes, new virtual machine asset maps may be generated and sent to the example remote agent (300). The asset catalog (324) and/or lifecycle policies (322) may be updated to reflect the new virtual machine asset maps.

The asset classification schema (328) may be similar to the asset classification schema (268, FIG. 2.2) of the example virtual machine (250). As will be discussed below, the asset classification schema (328) may be provided to virtual machines so that assets of each of the virtual machines are identified and/or characterized in a similar manner.

While the example remote agent (300) of FIG. 2.3 has been described and illustrated as including a limited number of components for the sake of brevity, a remote agent in accordance with embodiments of the invention may include additional, fewer, and/or different components than those illustrated in FIG. 2.3 without departing from the invention.

As discussed above, an asset catalog may be used by remote agents to prioritize the generation of backups. FIG. 3.2 shows a diagram of an example asset catalog (350) in accordance with one or more embodiments of the invention. The example asset catalog (350) may be a data structure for storing information regarding assets of any number of virtual machines.

The example asset catalog (350) may include any number of entries (e.g., 352, 360) for storing information regarding a corresponding asset. Each of the entries (e.g., 352, 360) may include an asset identifier (354), asset attributes (356), and an asset host identifier (358).

The asset identifier (354) may be information used to identify an asset associated with an entry (e.g., 352). The asset identifier (354) may be, for example, a name of the asset (e.g., a file name or other type of identifier). The asset identifier (354) may be used in conjunction with the asset identifiers of other entries of the example asset catalog (350) to identify each of the assets of any number virtual machine associated with corresponding virtual machines identified by the asset host identifier (358).

The asset attributes (356) may be information used to discriminate the asset associated with the asset attributes (356) from other assets. For example, the asset attributes (356) may include one or more of the following: (i) a transaction rate for the asset, (ii) the number of entities that transact with the asset, (iii) the quantity of data included in the asset, (iv) an average transaction rate for the asset, (v) a maximum transaction rate for the asset, and/or (vi) a minimum transaction rate for the asset. The attributes of the asset may include different attributes than those listed without departing from the invention.

The asset host identifier (358) may be information used to identify a virtual machine associated with the entry. For example, the asset host identifier (358) may be a name of a virtual machine, a universally unique identifier associated with the virtual machine, or another type of information used to discriminate the virtual machine that includes the asset from other virtual machines.

While the asset host identifier (358) of FIG. 3.2 has been described as including a limited amount of specific information, the asset host identifier (358) may include additional, different, and/or less information without departing from the invention. Additionally, while described as a list of entries (e.g., 352, 360), the asset host identifier (358) may have a different organizational structure, other than a list, without departing from the invention. Further, the asset host identifier (358) may be divided into any number of separate data structures and/or may be integrated into another data structure without departing from the invention.

Returning to FIG. 1, the remote agents (110) may provide data protection services to the production hosts (130) and/or other entities. FIGS. 4.1-4.3 illustrate methods that may be performed by the remote agents of the system of FIG. 1 when providing data protection services.

FIG. 4.1 shows a flowchart of a method in accordance with one or more embodiments of the invention. The method depicted in FIG. 4.1 may be used to obtain an asset map of a virtual machine in accordance with one or more embodiments of the invention. The method shown in FIG. 4.1 may be performed by, for example, remote agents (e.g., 110, FIG. 1). Other components of the system illustrated in FIG. 1 may perform all, or a portion, of the method of FIG. 4.1 without departing from the invention.

While FIG. 4.1 is illustrated as a series of steps, any of the steps may be omitted, performed in a different order, additional steps may be included, and/or any or all of the steps may be performed in a parallel and/or partially overlapping manner without departing from the invention.

In step 400, a new virtual machine for data protection services is identified.

In one or more embodiments of the invention, the new virtual machine is a virtual machine that has been recently instantiated in a production host. The new virtual machine may be identified for data protection services based on a message received from a production host that hosts the new virtual machine. For example, when a new virtual machine is instantiated, the production host hosting the virtual machine may notify remote agents of the instantiated new virtual machine.

In step 402, a discovery agent is instantiated in the new virtual machine.

In one or more embodiments of the invention, the discovery agent is instantiated by sending instructions to a production host that hosts the new virtual machine. The instructions may specify that a new discovery agent is to be instantiated.

In one or more embodiments of the invention, an asset discovery schema is provided to the production host along with the instructions to instantiate the discovery agent. A copy of the asset discovery schema may be stored in persistent storage of the new virtual machine.

In step 404, a virtual machine asset map for the virtual machine is obtained using the discovery agent.

In one or more embodiments of the invention, the virtual machine asset map for the virtual machine is obtained by sending instructions to the discovery agent of a virtual machine to generate the asset map. In response to receiving such instructions, the discovery agent may perform the method illustrated in FIG. 5 to generate the virtual machine asset map. In one or more embodiments of the invention, the generated virtual machine asset map is similar to that illustrated in FIG. 2.3. Once the virtual machine asset map is generated, the discovery agent may provide the virtual sheen asset map to the remote agents. For example, the discovery agent may send a copy of the virtual machine asset map to the remote agents.

Step 404 may be repeated to generate virtual machine asset maps on demand. As discussed above, changes to a virtual machine may make a virtual machine asset map out of date. New virtual machine asset maps may be generated to update an existing virtual machine asset map. For example, virtual machine asset maps may be periodically generated and sent to the remote storages. In another example, virtual machine asset maps may be generated and sent to the remote storage in response to predetermined events. The predetermined events may include the instantiation of an application on the persistent storage, changes in use patterns of application, removal of an application, or other types of events related to changes in the assets of virtual machines.

The method may end following step 404.

Via the method illustrated in FIG. 4.1, asset maps for any number of virtual machines may be obtained. The virtual machine asset maps may be used to generate lifecycle policies which are used when data protection services are provided by remote agents.

FIG. 4.2 shows a flowchart of a method in accordance with one or more embodiments of the invention. The method depicted in FIG. 4.2 may be used to generate a backup of a virtual machine in accordance with one or more embodiments of the invention. The method shown in FIG. 4.2 may be performed by, for example, remote agents (e.g., 110, FIG. 1). Other components of the system illustrated in FIG. 1 may perform all, or a portion, of the method of FIG. 4.2 without departing from the invention.

While FIG. 4.2 is illustrated as a series of steps, any of the steps may be omitted, performed in a different order, additional steps may be included, and/or any or all of the steps may be performed in a parallel and/or partially overlapping manner without departing from the invention.

In step 410, an asset catalog is updated using a virtual machine asset map associated with the virtual machine.

In one or more embodiments of the invention, the asset catalog is updated by replacing all, or a portion, of the asset catalog associated with the virtual machine with information included in the asset map. For example, the asset catalog may be an aggregation of the information included in any number of asset maps. The asset catalog may be updated by removing information from the asset catalog associated with the virtual machine and adding information included in the virtual machine asset map to the asset catalog. By doing so, the asset catalog may be updated to reflect the assets of the virtual machines for which the remote agents provide data protection services.

In step 412, a lifecycle policy is generated based on the asset catalog.

In one or more embodiments of the invention, lifecycle policy specifies the data protection strategy for the virtual machine. The data protection strategy may specify relative importance for generation of backups for the virtual machine with respect to the generation of backups for other virtual machines.

In one or more embodiments of the invention, lifecycle policy is generated by ranking virtual machines for which the remote agents provide data protection services based on commonalities included in the asset catalog. The commonalities may be, for example, the number of virtual machines that host each of the assets. The commonalities may be, for example, the number of virtual machines that utilize a particular asset. The commonalities may be, for example, the transaction frequency of a particular asset. The commonalities may be based on other information included in the asset catalog without departing from the invention.

For example, multiple virtual machines may host a copy of a particular asset and/or a type of an asset. Thus, all of the multiple virtual machines have the same commonality of hosting the particular asset and/or hosting of an asset of the type of the asset. The importance of the asset may be associated with the number of virtual machines that include a copy of the asset. Accordingly, the number of virtual machines that host a copy of a particular asset may indicate an importance of the asset. Consequently, all of the virtual machines that host the copy of the particular asset may have an importance that is the same as the importance of the asset.

In another example, multiple virtual machines may utilize a copy of a particular asset hosted by a virtual machine. Consequently, the importance of the asset may be very high. The virtual machine that hosts the particular asset may have an importance that is the same as the asset.

In a further example, an asset may be used very frequently resulting in a high transaction rate, e.g., access and/or modification rate. Consequently, the importance of the asset may be very high. The virtual machine that hosts the particular asset may have an importance that is the same as the asset.

Thus, the importance of each virtual machine may be derived from the importance of each of the assets hosted by each respective virtual machine. For example, the importance of each virtual machine may be derived by ranking each of the virtual machine, relative to each other virtual machine, based on the assets hosted by each of the virtual machines.

The lifecycle policy may be generated via the method illustrated in FIG. 4.3. Lifecycle policy may be generated via other methods without departing from the invention.

In step 414, a backup for the virtual machine is generated using the lifecycle policy.

In one or more embodiments of the invention, the backup for the virtual machine is generated using the lifecycle policy by prioritizing the generation of the backup for the virtual machine with respect to the generation of backups for other virtual machines. In other words, the lifecycle policy may specify a relative importance for generation of the backup of the virtual machine with respect to the backup of other virtual machines. When generation of the backup for the virtual machine is triggered by the lifecycle policy, the backup for the virtual machine may be prioritized with respect to generations of backups for other virtual machines that cannot be generated concurrently due to computing resource limitations.

In one or more embodiments of the invention, the backup for the virtual machine is generated by sending instructions for generating the backup to a production host that hosts the virtual machine. The instructions may specify that the backup for the virtual machine is to be generated in accordance with the lifecycle policy. For example, instructions may specify that the backup for the virtual machine is to be prioritized over backups for one or more other virtual machines. Upon receipt, the production host may prioritize generation of the backup for the virtual machine in accordance with instructions received from the remote agents.

The method may end following step 414.

As discussed above, a lifecycle policy may be used to generate a backup using the method illustrated in FIG. 4.2. FIG. 4.3 shows a flowchart of a method in accordance with one or more embodiments of the invention. The method depicted in FIG. 4.3 be used to generate a lifecycle policy in accordance with one or more embodiments of the invention. The method shown in FIG. 4.3 may be performed by, for example, remote agents (e.g., 110, FIG. 1). Other components of the system illustrated in FIG. 1 may perform all, or a portion, of the method of FIG. 4.3 without departing from the invention.

While FIG. 4.3 is illustrated as a series of steps, any of the steps may be omitted, performed in a different order, additional steps may be included, and/or any or all of the steps may be performed in a parallel and/or partially overlapping manner without departing from the invention.

In step 420, commonalities between assets specified in the asset catalog are identified.

As noted above, the commonalities may be characteristics of assets that indicate the relative importance of the assets with respect to other assets. For example, the commonalities may be the number of copies of the assets stored in the virtual machines, the transaction rate of each of the assets, the number of virtual machines that utilize each of the assets, and/or other characteristics of the assets, i.e., the asset attributes included in the asset catalog.

In step 422, the assets specified in the asset catalog are ranked based on the identified commonalities to obtain asset rankings.

In one or more embodiments of the invention, the asset rankings specify an ordering of the assets specified in the asset catalog in an order that corresponds to the number of copies of each asset. In other words, each asset is given a relative importance based on the number of copies of the asset specified in the asset catalog.

In one or more embodiments of the invention, the assets rankings specify multiple orderings of the assets. Each of the orderings may correspond to an attribute of the asset attributes. Each ordering may be based on the values of the corresponding attribute of each of the asset attributes.

For example, a first ordering may be based on a transaction frequency of each asset. A second ordering may be based on the number of virtual machines that utilize each asset. The asset rankings may specify any number of orderings based on any number of asset attributes.

In step 424, the lifecycle policy is generated based on the asset rankings.

In one or more embodiments of the invention, the policy lifecycle is generated by adding a priority to a lifecycle policy. The priority may specify the relative importance of generating a backup for the virtual machine with respect to generation of backups for other virtual machines.

In one or more embodiments of the invention, the priority is determined by ranking all of the virtual machines based on a composite ranking for each virtual machine. The composite ranking may be determined by averaging the ranks of each asset hosted by a virtual machine.

For example, consider a scenario in which a virtual machine hosts a database application and an email application. The data of the database application may have a ranking of 8 and the data of the email application may have a ranking of 4. To determine the composite ranking of the remote agent, an average of these rankings may be determined. In other words, the virtual machine may have a composite ranking of 6 ([4+8]/2=6).

In one or more embodiments of the invention, the average ranking of each asset hosted by a virtual machine is a weighted average. For example, the average may be weighted by weighting the rank of each asset based on the amount of data of the asset, the transaction rate of the asset, or another attribute of the asset.

For example, consider a second scenario in which a virtual machine hosts a database application and an email application. The data of the database application may have a ranking of 8 and the data of the email application may have a ranking of 4. The data of the database application may be 100 gigabytes while the data of the email application may be 6.25 gigabytes. To determine the composite ranking of the remote agent, a weighted average of these rankings may be determined. In other words, the virtual machine may have a composite ranking of 6 ([4*6.25+8*100]/110=7.5).

In one or more embodiments of the invention, other characteristics, other than priority, are generated based on the composite ranking. For example, a frequency of backup, number of copies stored, and/or other characteristics of a data protection strategy specified by the lifecycle policy may be based on the composite ranking.

The frequency may specified be specified by the lifecycle policy that determines when a backup generation for the virtual machine is triggered. A larger composite ranking may cause a higher frequency to be included in the lifecycle policy while a smaller composite ranking may cause a lower frequency to be included in the lifecycle policy. For example, the highest composite ranking may correspond to a frequency of twice daily while the smallest composite ranking may correspond to a once a week frequency.

The method may end following Step 424.

As discussed above, an asset catalog, used to generate a lifecycle policy, may be generated using virtual machine asset maps. Virtual machine asset maps may be generated by discovery agents. Remote agents may send requests to discovery agents to generate and provide virtual machine asset maps FIG. 5 shows a flowchart of a method in accordance with one or more embodiments of the invention. The method depicted in FIG. 5 may be used to respond to a request for a virtual machine asset map in accordance with one or more embodiments of the invention. The method shown in FIG. 5 may be performed by, for example, production hosts (e.g., 130, FIG. 1). Other components of the system illustrated in FIG. 1 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, a virtual machine is crawled using an asset classification schema to identify assets of the virtual machine.

In one or more embodiments of the invention, virtual machine is crawled by comparing portions of data of the virtual machine to asset types specified by the asset classification schema. Portions of data of the virtual machines matching the asset types may be identified as assets of the matching asset types. Via the crawling of the virtual machine, a list of the assets of the virtual machine may be obtained.

In step 502, each of the identified assets are characterized using the asset classification schema to obtain asset attributes for each of the identified assets. As discussed above, the asset classification schema may include rules that may be used to obtain the asset attributes.

For example, the rules of the asset classification schema may specify one or more actions to be performed by a discovery agent to obtain the asset attribute corresponding to the rule. The asset classification schema may include any number of rules to obtain any number of asset attributes for each of the assets of the virtual machine.

In step 504, a virtual machine asset map is generated based on (i) the identified assets and (ii) the asset attributes corresponding to each of the identified assets. For example, the virtual machine asset map may be a data structure that includes a list of the identified assets. For each of the identified assets, the virtual machine asset map may include corresponding asset attributes. The virtual machine asset map may be similar to the example virtual machine asset map (270, FIG. 2.3) illustrated in FIG. 2.3.

In step 506, the virtual machine asset map is provided to a remote agent.

In one or more embodiments of the invention, the virtual machine asset map is provided to the remote agent by sending the virtual machine asset map to the remote agent. The virtual machine asset map may be provided to the remote agent via other methods without departing from the invention.

The method may end following step 506.

To further clarify embodiments of the invention, a non-limiting example is provided in FIGS. 6.1-6.5. Each of these figures may illustrate a system similar to that illustrated in FIG. 1 at different points in times. For the sake of brevity, only a limited number of components of the system of FIG. 1 are illustrated in each of FIGS. 6.1-6.5.

Example

Consider a scenario as illustrated in FIG. 6.1 in which a remote agent (600) is providing data protection services to a production host (610). The production host (610) hosts a first virtual machine (612). The first virtual machine (612) hosts an email application that generates email application data (614).

To provide data protection services to the production host (610), the remote agent (600) instantiates a discovery agent (not shown) and the first virtual machine (612). Once instantiated, the discovery agent generates a virtual machine asset map of the first virtual machine (612). The virtual machine asset map (not shown) indicates an asset of email application data (614). Once generated, the discovery agent sends the virtual machine asset map to the remote agent (600).

In response to receiving the virtual machine asset map, the remote agent (600) updates an asset catalog (not shown) using the virtual machine asset map. After updating the asset map, the remote agent (600) generates lifecycle policies (602) using the asset catalog. The lifecycle policies (602) specify that the first virtual machine is ranked in priority 1 for backup generation purposes. In other words, the lifecycle policies (602) specify that the first virtual machine is to be prioritized above all of the virtual machines for backup generation purposes.

After generating the lifecycle policies (602), a second virtual machine (616) is instantiated in the production hosts (610) as shown in FIG. 6.2. The second virtual machine (616) hosts a database application (not shown) that stores database application data (618) and the second virtual machine (616). After instantiating the second virtual machine (616), the production host (610) sends a notification to the remote agent (600) that the second virtual machine (616) has been instantiated.

In response to the notification, the remote agent (600) instantiates a second discovery agent (not shown) in the second virtual machine (616). After instantiation, the second discovery agent generates a second virtual machine asset map (not shown) for the second virtual machine (616). The second virtual machine asset map specifies an asset of the database application data (618). After generating the second virtual machine asset map, the second discovery agent sends the second virtual machine asset map to the remote agent (600).

In response to receiving the second virtual machine asset map, the remote agent (600) updates the asset catalog to reflect that to assets are now included in the virtual machines. Once the asset catalog is updated, the remote agent (600) updates the lifecycle policies (602) as illustrated in FIG. 6.3.

As seen in FIG. 6.3, the updated lifecycle policies (602) specify that the second virtual machine (616) is priority 1 for backup generation purposes while the first virtual machine (612) has been demoted to priority 2 for backup generation purposes. These priorities reflect that the database application data (618) of the second virtual machine (616) is of a higher importance for backup generation purposes than the email application data (614) of the first virtual machine (612). Thus, when computing resources are limited and backups for both of the virtual machines are scheduled for generation, the backup generation for the second virtual machine (616) will be prioritized over the backup generation for the first virtual machine (612).

After the lifecycle policies (602) are updated, a third virtual machine (620) is instantiated in the production host (610) as illustrated in FIG. 6.4. The third virtual machine (620) hosts a second instance of the email application of the first virtual machine (612) and generates email application data (622). After instantiating the third virtual machine (620), the production host (610) sends a second notification to the remote agent (600) indicating that the third virtual machine (620) has been instantiated.

In response to the second notification, the remote agent (600) instantiates a third discovery agent (not shown) in the third virtual machine (620). Once instantiated, the third discovery agent generates a third virtual machine asset map that reflects an asset of the email application data (622). After generating the third virtual machine asset map, the third discovery agent sends the third virtual machine asset map to the remote agent (600).

In response to receiving the third virtual machine asset map, the remote agent (600) updates the asset catalog (not shown). After updating, the asset catalog specifies that the virtual machines include two copies of an asset that is email application data (614, 622) and a third asset that is the database application data (618). After updating the asset catalog, the remote agent (600) updates the lifecycle policies (602) based on the updated asset catalog as illustrated in FIG. 6.5.

As seen in FIG. 6.5, the lifecycle policies (602) now specify that the first virtual machine (612) has a priority of 1, the third virtual machine (620) has a priority of 2, and the second virtual machine (616) has a priority of 3 for backup generation purposes. Consequently, when computing resources are limited, the first virtual machine (612) will be prioritized over both of the second virtual machine (616) and the third virtual machine (620) for backup generation purposes. The third virtual machine (620) will similarly be prioritized for backup generation purposes over the second virtual machine (616).

These priorities were determined in this manner because of the commonality of the email application data (614, 622). In other words, the first virtual machine (612) and the third virtual machine (620) are being prioritized for backup generation purposes over the second virtual machine (616) because they both include the email application data which, due to there being multiple copies of the email application data hosted by the virtual machine, has been determined as being more important than the database application data.

End of Example

Figure 7:
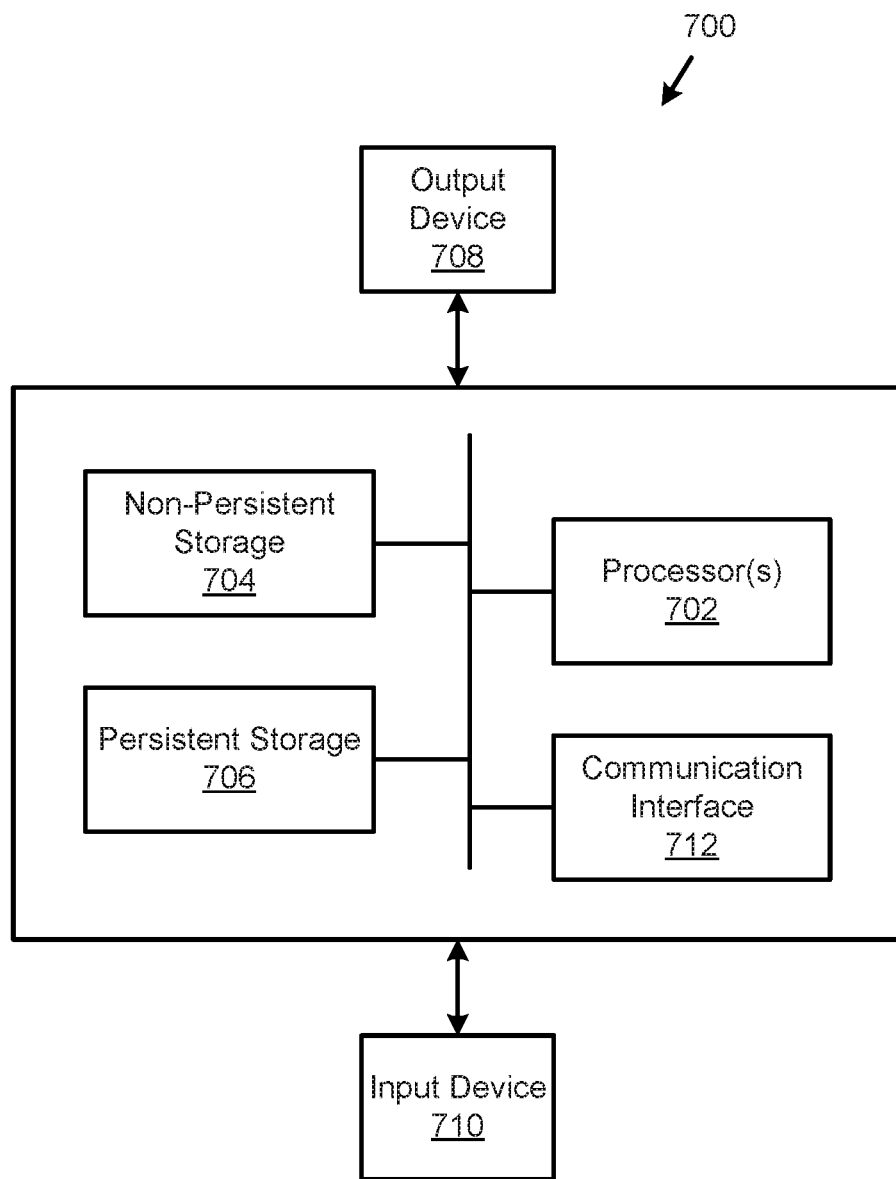
FIG. 7 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide the method for managing the limited computing resources of a distributed system a backup generation purposes. For example, embodiments of the invention may provide an architecture for determining when and for which backups of components of the distributed system should be generated to reduce the likelihood of losing important data. Embodiments of the invention may provide a method that distributes the computational workload for making such determinations across multiple components of the distributed system.

Additional embodiments of the invention may provide a method for prioritizing backup generation that prioritizes different portions of data for backup without needing to interrogate the contents of the data. Consequently, data privacy may be maintained while more important portions of data may be identified and prioritized for backup generation purposes.

Thus, embodiments of the invention may address the problem of the limited availability of computational resources in a distributed system that relies on data redundancy for data protection purposes. Specifically, embodiments of the invention may provide a method of distributing the computational load for making such determinations and/or enabling data privacy to be maintained while providing backup prioritization services.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A remote agent for providing data protection services, comprising:
   persistent storage for storing lifecycle policies; and
   a backup manager programmed to:
   update an asset catalog using an asset map associated with a virtual machine;
   generate a lifecycle policy of the lifecycle policies using the asset catalog,
   wherein generating the lifecycle policy of the lifecycle policies using the asset catalog comprises:
   identifying commonalities between assets specified in the asset catalog;
   ranking the assets specified in the asset catalog based on the identified commonalities to obtain asset rankings; and
   generating the lifecycle policy based on the asset rankings, wherein the lifecycle policy is generated based on the asset rankings by:
   generating a first composite ranking for the virtual machine using the asset rankings;
   generating a second composite ranking for a second virtual machine using the asset rankings; and
   adding a priority, based on the first composite ranking, to the lifecycle policy that is higher than a second priority of a second lifecycle policy associated with the second virtual machine; and
   generate a backup for the virtual machine using the lifecycle policy, wherein the lifecycle policy prioritizes generating the backup for the virtual machine over generating a second backup for the second virtual machine.

2. The remote agent of claim 1, wherein the backup manager is further programmed to:
prior to updating the asset catalog:
instantiate a discovery agent in the virtual machine; and
obtain the asset map using the discovery agent.

3. The remote agent of claim 2, wherein obtaining the asset map using the discovery agent comprises:
crawling the virtual machine using an asset classification schema to identify assets of the virtual machine;
characterizing each of the identified assets using the asset classification schema to obtain assets attributes for each of the identified assets; and
updating the asset map based on:
the assets, and
the asset attributes.

4. The remote agent of claim 3, wherein the asset classification schema specifies:
types of assets; and
characteristics of each of the types of assets that define the asset attributes.

5. The remote agent of claim 1, wherein the commonalities are a number of copies of each asset specified in the asset catalog.

6. The remote agent of claim 5, wherein the asset rankings is an ordering of the assets specified in the asset catalog in an order that corresponds to the number of copies of each asset.

7. The remote agent of claim 1, wherein generating the first composite ranking for the virtual machine using the asset rankings comprises:
identifying a first ranking of the asset rankings associated with a first asset of the virtual machine;
identifying a second ranking of the asset rankings associated with a second asset of the virtual machine; and
generating the first composite ranking using, in part, the first ranking and the second ranking.

8. The remote agent of claim 7, wherein generating the first composite ranking using, in part, the first ranking and the second ranking comprises generating an average using at least the first ranking and the second ranking.

9. A method for providing data protection services based on lifecycle policies, comprising:
updating an asset catalog using an asset map associated with a virtual machine;
generating a lifecycle policy of the lifecycle policies using the asset catalog,
wherein generating the lifecycle policy of the lifecycle policies using the asset catalog comprises:
identifying commonalities between assets specified in the asset catalog;
ranking the assets specified in the asset catalog based on the identified commonalities to obtain asset rankings; and
generating the lifecycle policy based on the asset rankings, wherein the lifecycle policy is generated based on the asset rankings by:
generating a first composite ranking for the virtual machine using the asset rankings;
generating a second composite ranking for the second virtual machine using the asset rankings; and
adding a priority, based on the first composite ranking, to the lifecycle policy that is higher than a second priority of a second lifecycle policy associated with a second virtual machine; and
generating a backup for the virtual machine using the lifecycle policy,
wherein the lifecycle policy prioritizes generating the backup for the virtual machine over generating a second backup for the second virtual machine.

10. The method of claim 9, further comprising:
prior to updating the asset catalog:
instantiate a discovery agent in the virtual machine; and
obtain the asset map using the discovery agent.

11. The method of claim 10, wherein obtaining the asset map using the discovery agent comprises:
crawling the virtual machine using an asset classification schema to identify assets of the virtual machine;
characterizing each of the identified assets using the asset classification schema to obtain assets attributes for each of the identified assets; and
generating the asset map based on:
the assets, and
the asset attributes.

12. The method of claim 11, wherein the asset classification schema specifies:
types of assets; and
characteristics of each of the types of assets that define the asset attributes.

13. A non-transitory computer readable medium comprising computer readable program code, which when executed by a computer processor enables the computer processor to perform a method for providing data protection services based on lifecycle policies, the method comprising:
updating an asset catalog using an asset map associated with a virtual machine;
generating a lifecycle policy of the lifecycle policies using the asset catalog,
wherein generating the lifecycle policy of the lifecycle policies using the asset catalog comprises:
identifying commonalities between assets specified in the asset catalog;
ranking the assets specified in the asset catalog based on the identified commonalities to obtain asset rankings; and
generating the lifecycle policy based on the asset rankings, wherein the lifecycle policy is generated based on the asset rankings by:
generating a first composite ranking for the virtual machine using the asset rankings;
generating a second composite ranking for a second virtual machine using the asset rankings; and
adding a priority, based on the first composite ranking, to the lifecycle policy that is higher than a second priority of a second lifecycle policy associated with the second virtual machine; and
generating a backup for the virtual machine using the lifecycle policy,
wherein the lifecycle policy prioritizes generating the backup for the virtual machine over generating a second backup for the second virtual machine.

14. The non-transitory computer readable medium of claim 13, wherein the method further comprises:
prior to updating the asset catalog:
instantiate a discovery agent in the virtual machine; and
obtain the asset map using the discovery agent.

15. The non-transitory computer readable medium of claim 14, wherein obtaining the asset map using the discovery agent comprises:
crawling the virtual machine using an asset classification schema to identify assets of the virtual machine;
characterizing each of the identified assets using the asset classification schema to obtain assets attributes for each of the identified assets;
generating the asset map based on:
the assets, and
the asset attributes.

16. The non-transitory computer readable medium of claim 15, wherein the asset classification schema specifies:
types of assets; and
characteristics of each of the types of assets that define the asset attributes.

* * * * *